(12) United States Patent
Barber

(10) Patent No.: US 6,651,967 B1
(45) Date of Patent: Nov. 25, 2003

(54) ALIGNMENT CLAMP

(76) Inventor: Franklin R. Barber, 2475 Conley Rd., Morris, IL (US) 60450

( * ) Notice: Subject to any disclaimer, the term of this patent is extended or adjusted under 35 U.S.C. 154(b) by 33 days.

(21) Appl. No.: 09/971,482

(22) Filed: Oct. 5, 2001

(51) Int. Cl.[7] .................................................. B25B 1/20
(52) U.S. Cl. ........................... 269/43; 7/139; 81/5.1 R; 269/131; 228/49; 228/49.3
(58) Field of Search ......................... 269/43, 130, 131, 269/132; 228/49.3, 44.5; 29/272; 285/21, 22, 411; 81/5.1 R; 7/139

(56) References Cited

U.S. PATENT DOCUMENTS

| | | | | |
|---|---|---|---|---|
| 827,079 | A | * | 7/1906 | Clark ............................ 82/167 |
| 1,103,243 | A | * | 7/1914 | Amborn ...................... 269/130 |
| 1,130,395 | A | * | 3/1915 | Gilmour ........................ 30/100 |
| 1,174,764 | A | | 3/1916 | Riesenberg |
| 1,209,049 | A | | 12/1916 | Sheets |
| 1,354,494 | A | | 10/1920 | King |
| 1,489,458 | A | | 4/1924 | Petersen |
| 1,670,583 | A | | 5/1928 | Lawrence |
| 1,848,527 | A | | 3/1932 | Hickey |
| 1,916,556 | A | | 7/1933 | Butt |
| 1,940,910 | A | | 12/1933 | Hickey |
| 1,969,572 | A | | 8/1934 | Maurer |
| 1,992,322 | A | | 2/1935 | Nulf et al. |
| 2,042,137 | A | | 5/1936 | Wilson |
| 2,054,375 | A | | 9/1936 | Halle |
| 2,102,259 | A | | 12/1937 | Edwards et al. |
| 2,167,887 | A | | 8/1939 | Graham et al. |
| 2,308,340 | A | | 1/1943 | Newlon |
| 2,514,130 | A | | 7/1950 | Jones |
| 2,519,630 | A | | 8/1950 | Bover |
| 2,557,202 | A | | 6/1951 | Ravmond et al. |
| 2,664,774 | A | | 1/1954 | Harvie |
| 2,674,966 | A | | 4/1954 | Morris |
| 2,793,433 | A | | 5/1957 | Wheeler |
| 2,803,277 | A | | 8/1957 | Gamura |
| 2,846,968 | A | | 8/1958 | Tipton |
| 2,888,895 | A | | 6/1959 | Coodv et al. |
| 2,906,154 | A | | 9/1959 | Seppola |
| 2,932,226 | A | | 4/1960 | Sepploa |
| 3,047,286 | A | | 7/1962 | Kinne |
| 3,192,804 | A | | 7/1965 | Petersen et al. |
| 3,284,883 | A | | 11/1966 | Haverfield |
| 3,380,148 | A | | 4/1968 | Nelson et al. |
| 3,408,729 | A | | 11/1968 | Gersbacher |
| 3,422,519 | A | | 1/1969 | Fehlman |

(List continued on next page.)

OTHER PUBLICATIONS

Picture of prior–art pipe clamp made from angle sections and C–clamps, taken by Franklin Barber, Apr. 27, 2001 (2 pages), Morris, IL.
Advertisement for Adjustable Pipe Clamp, H&M Pipe Beveling Machine Company, Inc., Tulsa, OK.
Picture of prior–art "Jewell" pipe clamp, taken by Franklin Barber, Apr. 27, 2001, Morris, IL.
Advertisement for Adjustable Pipe Clamp, Walhonde Tools, Inc., South Charleston, WV.

(List continued on next page.)

*Primary Examiner*—Joseph J. Hail, III
*Assistant Examiner*—Daniel Shanley
(74) *Attorney, Agent, or Firm*—Elias M. Gordan

(57) ABSTRACT

A clamp for aligning the confronting ends of two or more workpieces, preparatory to their permanent joining. This clamp utilizes a chain of cruciform cross-section, and one or more alignment apparatuses, to encompass and secure the first workpiece, and align the remaining connecting workpiece(s). The chain may be fitted to the first workpiece, using color coding to select added chain-link sections for larger workpieces. Each alignment apparatus is slid on the chain, and secured by a spring-biased detent. The chain is then secured about the first workpiece. The alignment apparatus overlies the connecting workpieces, which are then aligned for joining, using one or more adjustable fasteners mounted on the alignment apparatus.

53 Claims, 4 Drawing Sheets

U.S. PATENT DOCUMENTS

| | | | |
|---|---|---|---|
| 3,467,295 | A | 9/1969 | Watson |
| 3,480,270 | A | 11/1969 | Gill |
| 3,593,402 | A | 7/1971 | Mori |
| 3,653,574 | A | 4/1972 | Dearman |
| 3,666,159 | A | 5/1972 | Watson |
| 3,704,503 | A | 12/1972 | Havwood |
| 3,705,453 | A | 12/1972 | Olson |
| 3,711,920 | A | 1/1973 | Simmons, Jr. |
| 3,733,706 | A | 5/1973 | Blohm |
| 3,901,497 | A | 8/1975 | Dearman |
| 3,944,202 | A * | 3/1976 | Dearman .................... 269/130 |
| 3,952,936 | A | 4/1976 | Dearman |
| 4,011,979 | A | 3/1977 | Hagen et al. |
| 4,338,712 | A | 7/1982 | Dearman |
| 4,356,615 | A | 11/1982 | Dearman |
| 4,392,641 | A | 7/1983 | Dearman |
| 4,440,383 | A | 4/1984 | Dearman |
| 4,477,937 | A | 10/1984 | Costello |
| 4,492,015 | A | 1/1985 | Dearman |
| 4,586,647 | A | 5/1986 | Dearman |
| 4,623,085 | A | 11/1986 | Dearman |
| 4,666,138 | A | 5/1987 | Dearman |
| 4,726,575 | A | 2/1988 | Dearman |
| 5,094,435 | A | 3/1992 | Depperman et al. |

OTHER PUBLICATIONS

Picture of prior–art "Quick Clamp", taken by Franklin Barber, Apr. 27, 2001, Morris, IL.

Advertisements from Mathey–Dearman Website, http://www.mathey.com, and Advertisement for Free Pipe-fitter Video, Mathey–Dearman, Tulsa, OK (2 pages).

Advertisement for Master Chain Clamp, H&M Website, www.hmpipe.com, H&M Pipe Beveling Machine Company, Inc. Tulsa, OK, May 2, 2001.

Advertisements, H&M Website, www.hmpipe.com, H&M Pipe Beveling Machine Company, Inc., Tulsa, OK, May 2, 2001, (2 pages).

Advertisements, Walhonde Tools Website, http://www.walhonde.com, Walhonde Tools, Inc., South Charleston, WV, May 2, 2001 (5 pages).

Catalog, H&M Pipe Beveling Machine Company, Inc., Tulsa, OK, 4/00, p. 11–13 (4 pages). Catalog, Carr–Lane Manufacturing, St. Louis, MO, 1992, p. XXII (2 pg).

Article, FARM SHOW (magazine), vol. 25, No. 5, Sep.–Oct., 2001, p. 27, Farm Show Publishing, Inc., Lakewood, MN, http://www.farmshow.com (1 pg).

* cited by examiner

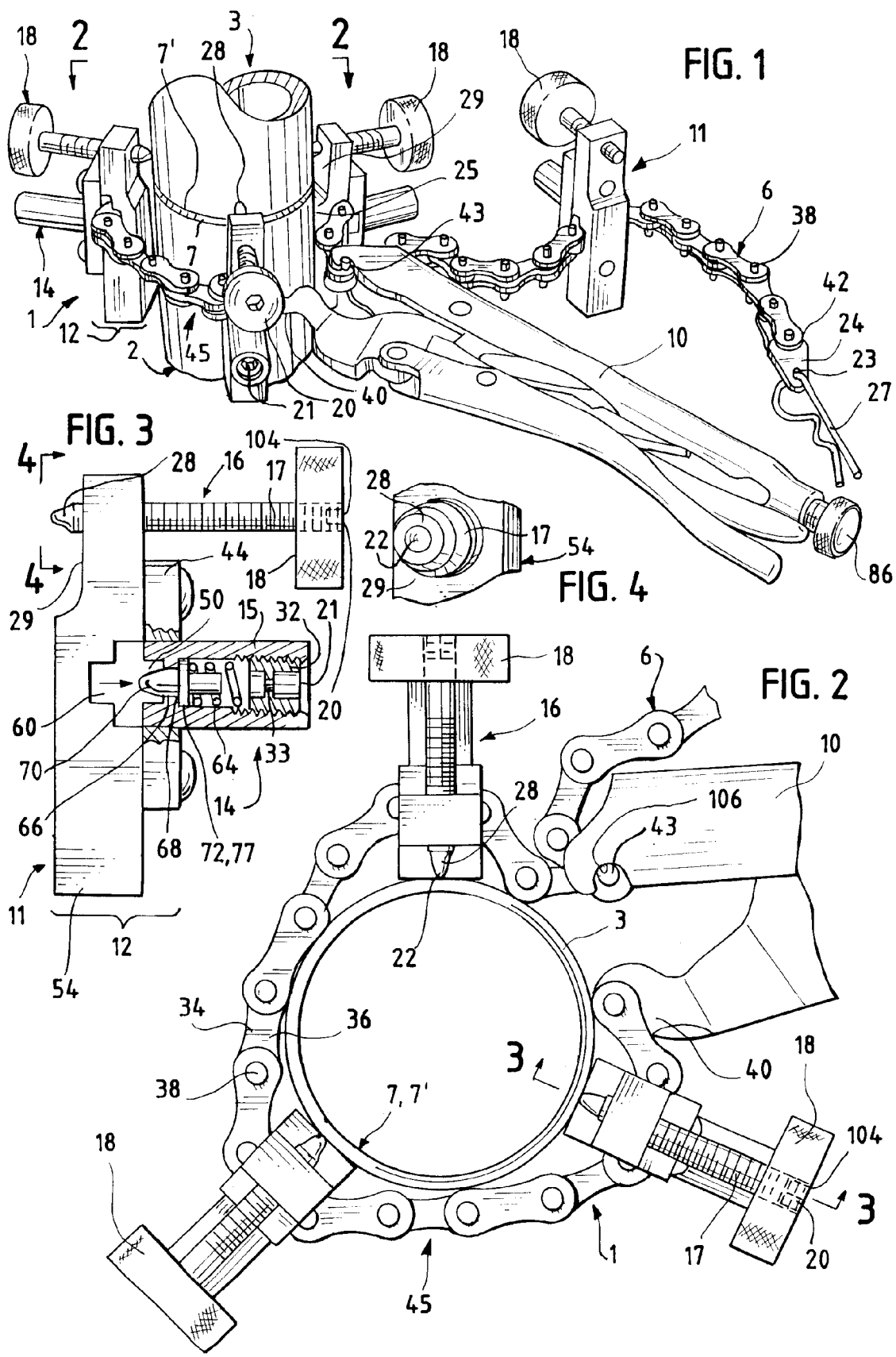

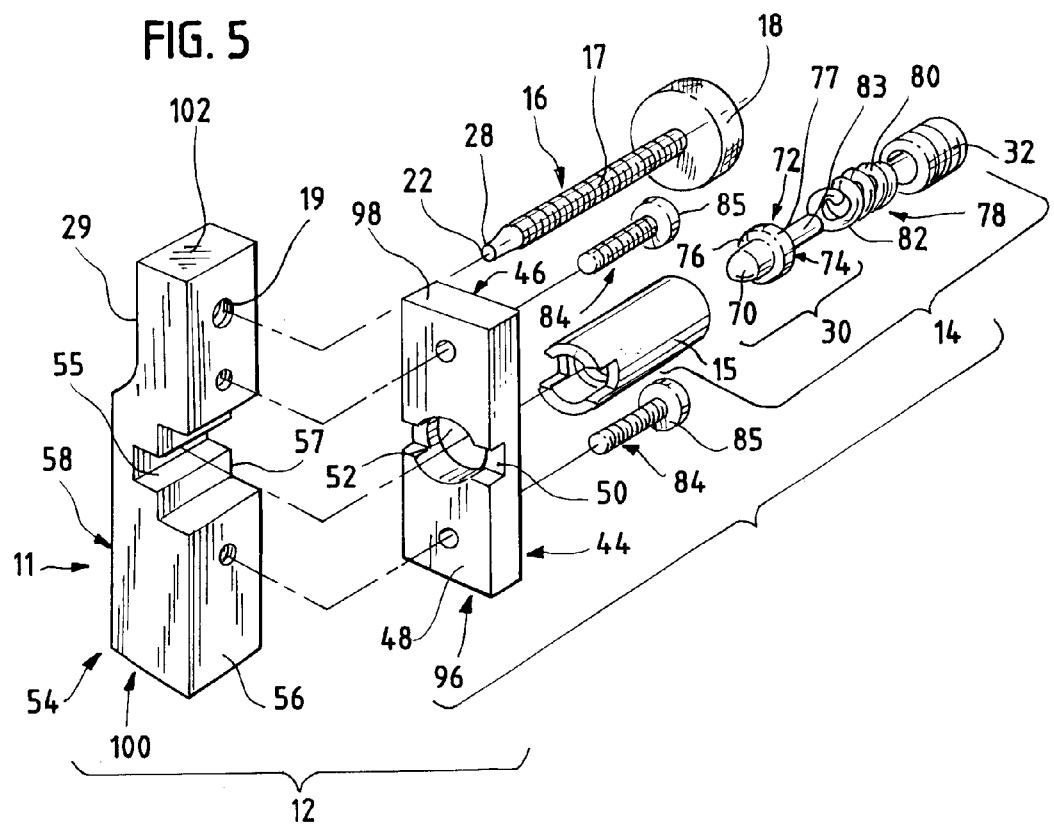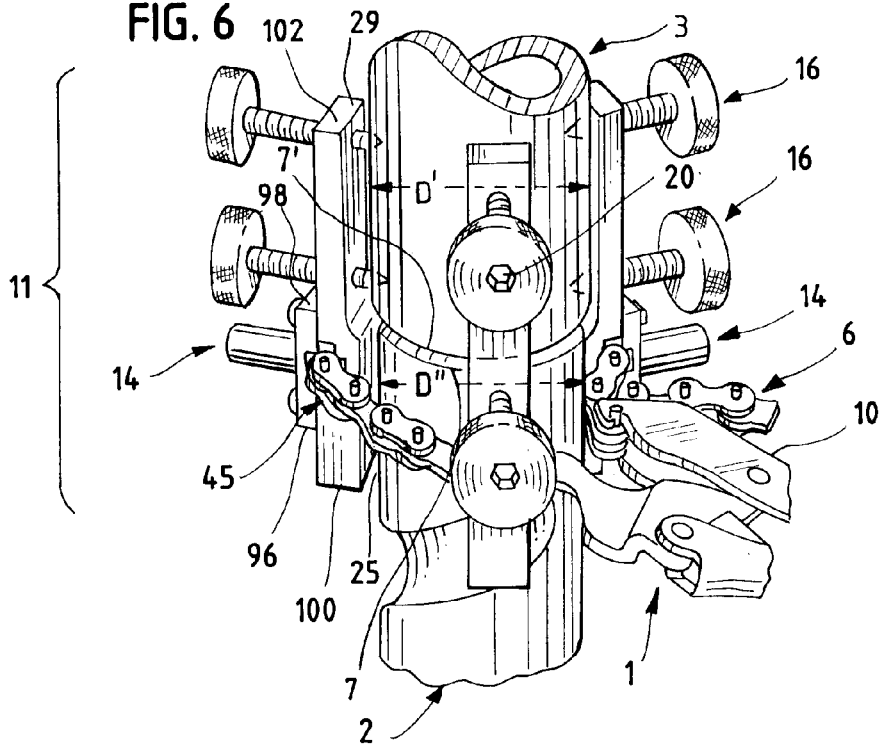

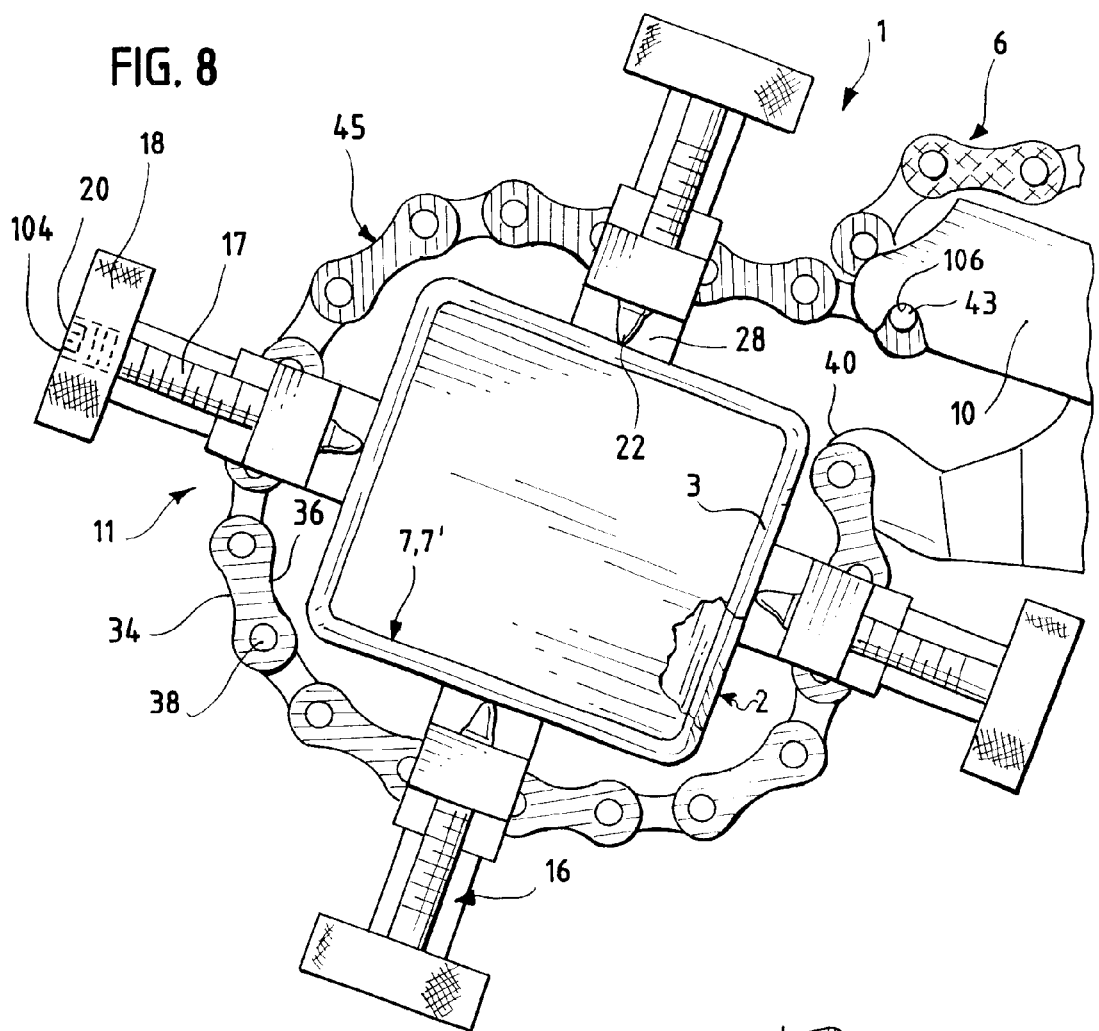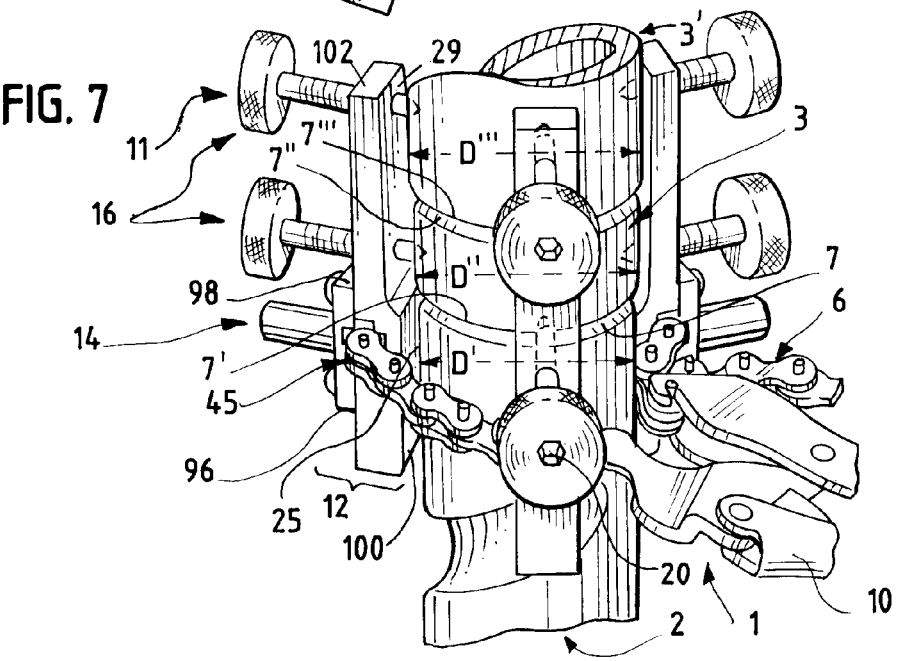

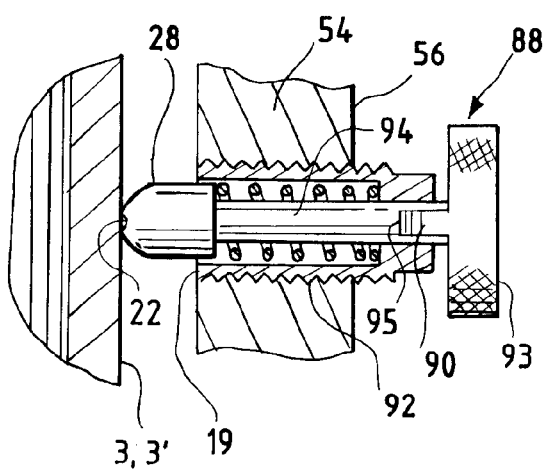
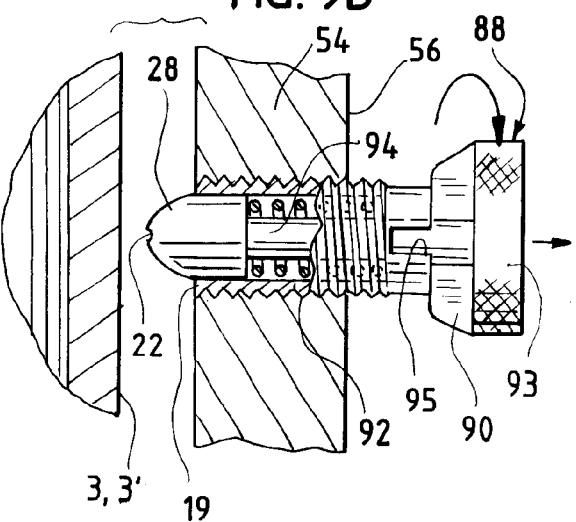
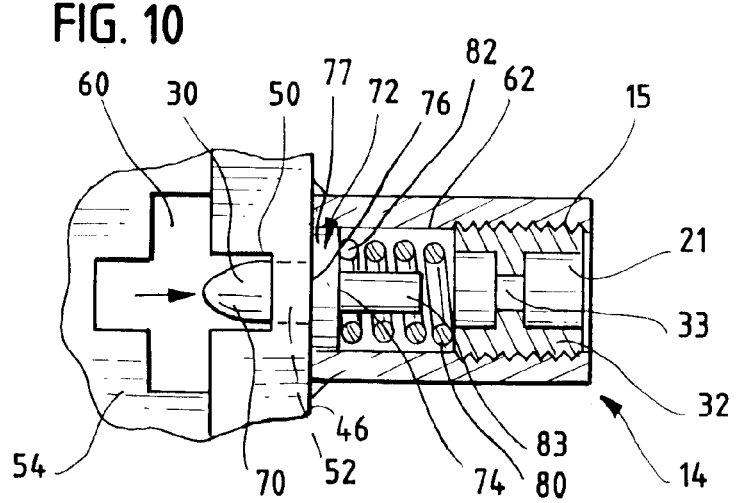
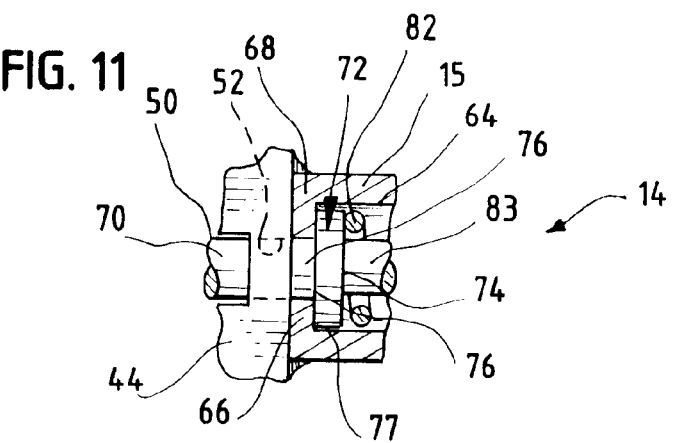

ALIGNMENT CLAMP

CROSS REFERENCES TO RELATED APPLICATIONS

Not applicable.

STATEMENT REGARDING FEDERALLY-SPONSORED RESEARCH OR DEVELOPMENT

Not applicable.

REFERENCE TO A MICROFICHE APPENDIX

Not applicable.

BACKGROUND OF THE INVENTION-FIELD OF THE INVENTION

This invention is directed to the temporary end-to-end alignment of two or more workpieces, such as tubing, pipe, handrail, fittings, shafts, or solid bar, to facilitate their permanent joining, by welding, brazing, soldering, adhesive application, or other physical or chemical means. This invention is intended to fulfill a long-felt need for an alignment device that is light, small, portable, interchangeable, easily maneuverable in confined spaces, and readily usable by pipefitters, millwrights, welders, plumbers, ironworkers, and other practitioners in the fabrication, construction, and repair trades, having a variety of skills and aptitudes.

BACKGROUND OF THE INVENTION-DESCRIPTION OF PRIOR ART

In the fabrication, construction and repair trades, there has persisted a very real problem of pre-positioning and holding a pair of pipe sections together, prior to their joining by welding or other permanent attachment. The problem has been compounded for pipes, fittings, and other workpieces of non-circular cross-section, since the prior art has tended to focus on circular pipe. Pipe sections, tube sections, solid sections, and workpieces of other cross-sections can be quite heavy, and it can be difficult, under the best of circumstances, to align successive sections, to hold a connecting section in exact alignment with, and, in appropriate space relationship with, its prior section. This problem is exacerbated in tight work areas, such as buildings, and with vertical or near-vertical workpieces, such as stack pipes or poles. Small workpieces, at the other end of the spectrum, may be lighter to hold, but harder to handle, due to placement in confined areas, or areas partially or mostly inaccessible to the tradesperson. This situation is complicated when the tradesperson must align and/or attach pipe of varying outer diameters, having the same inner diameter. The situation is also complicated when the tradesperson must align and/or attach various forms of fittings, including, but not limited to, elbows, reducers, tees, crosses, caps, stubs, rings, flanges, and weldments.

Various attempts have been made over the years to address these problems. The earliest attempts used a combination of a C-shaped clamp, an angle iron, and a chain or chain clamp, to effect alignment. Later attempts, such as the devices covered by Hickey U.S. Pat. Nos. 1,848,527, and 1,940,910, issued, respectively, on Mar. 8, 1932 and Dec. 26, 1933, combined a rigid frame, a chain, and a rotatable handle, for restraint of adjacent pipe/pipe joints and adjacent pipe/fitting joints, respectively. However, the heavy, rigid frame and rotatable handle of the Hickey clamps require substantial working room and storage room.

Other attempts in the prior art include U.S. Pat. No. 3,192,804, granted to Peterson on Jul. 6, 1965, for a chain clamp utilizing a locking wrench, and U.S. Pat. No. 4,477,937, granted to Costello on Oct. 23rd, 1984, for a combination pliers, clamp, and wrench, but neither hand tool provides fittings for aligning successive workpieces.

Recent art for pipe alignment devices has evolved along two approaches, the first approach utilizing a rigid, lockable clamp, secured by a single arcuate movement at the perimeter of the pipe, the second approach utilizing a crank-tightened chain. Examples of the first, rigid approach include U.S. Pat. No. 2,846,968, issued to Tipton on Aug. 12, 1958; U.S. Pat. No. 3,422,519, issued to Fehlman on Jan. 21,1969; U.S. Pat. No. 3,467,295, issued to Watson on Sept. 16, 1969; and U.S. Pat. No. 3,952,936, issued to Dearman on Apr. 27th, 1976. The use of rigid clamps, however, is limited to a single size of circular pipe. Furthermore, such clamps have a tendency to be bulky and heavy, especially for larger pipe diameters.

Examples of the second, chain approach, include the following patents:

U.S. Pat. No. 3,593,402, issued to Mori on Jul. 20, 1971
U.S. Pat. No. 3,653,574, issued to Dearman on Apr. 4, 1972
U.S. Pat. No. 3,666,159, issued to Watson on May 30, 1972
U.S. Pat. No. 3,704,503, issued to Haywood on Dec. 5, 1972
U.S. Pat. No. 3,705,453, issued to Olson on Dec. 12, 1972

Further examples can be seen in a series of additional patents issued to Dearman:

U.S. Pat. No. 3,901,497, issued Aug. 26, 1975;
U.S. Pat. No. 3,944,202, issued Mar. 16th 1976;
U.S. Pat. No. 3,952,936, issued Apr. 27th 1976;
U.S. Pat. No. 4,586,647, issued May 6, 1986; and
U.S. Pat. No. 4,726,575, issued Feb. 23rd, 1988.

Unaddressed problems have persisted with the chain approach, nevertheless. Slender, threaded shafts, and intermeshing gear means have been attempted, as disclosed by Mori, but slender shafts have a tendency to break under heavy use, and intermeshing gear means can be difficult to adjust, especially when placed close to the workpiece. Attempts have been made to utilize alignment plates permanently joined to the chain, as disclosed in the Olson and Haywood patents, but permanently-joined plates are not adjustable along the chain, for different sizes of pipe. Other attempts have been made to mount alignment devices on the chain using wires, as shown in the Watson '159 patent, but complications arise from the fragility of the mounting wire, and the lack of bearing area between the chain and the alignment device. The lack of bearing area can lead to rotation and wobble of the alignment device as the chain is tightened.

More recent art for flexible chain clamps is disclosed in the aforementioned Dearman patents, which tend to utilize a combination of jackbars resting on a double or triple chain, the chain held at one end by a pivoting stop, and tightened at the other end by the rotation of a hand crank. Handcranks, however, cannot be fitted in small, congested, or difficult-to-reach workspaces. The jack bars disclosed to date can be complex to make, and easy to abuse and break, due to the number and complexity of their components. The size, weight, and complexity of the various prior-art combinations are ill-adapted for use on non-horizontal workpieces (such as vertical pipe, vertical shafts, or flagpoles), or small size workpieces. A large clamp, and its component crank, can dwarf, or even damage a small workpiece. Excessive lengths of chain can interfere with the operator, particularly in tight spaces. Rotation and wobble of the jackbar can occur during tightening of the chain, due to the gap between the chain and the jackbar, required for movement of the jackbar along the chain.

As alluded to, in the background of the Dearman '575 patent disclosure, cost, weight, and, by extension, complexity, are important considerations in this art. Overall, the prior art has taught towards greater complexity, and has not addressed the possibility of a slidable alignment of jack bar and chain without nuts, screws, or hand tools to adjust.

The prior art has also focused on pipe, to the exclusion of shapes other than circular pipe cross-sections, and has tended to use chain of rectangular cross section, compromising the stability of the alignment apparatus attached to it. In addition, none of the above prior art has addressed the possibility of aligning more than two workpieces at a time.

Moreover, the prior art, as a whole, has tended to align connecting pipe pieces with sharp-pointed screws or nuts. This can create problems for pipe, fittings, and other workpieces made of titanium or other specialty metals, especially where installed in clean environments, such as food processing facilities, semiconductor assembly buildings, or pharmaceutical plants. Sharp-pointed screws, as used in most of the prior art, can create scratches in the stock or pipe, either causing corrosion in the scratch, or allowing impurities to accumulate in the scratch. Swivel feet could be mounted on the screws or nuts, as disclosed in the later Dearman patents, but would add to the cost and complexity of fabrication.

In summation, pipefitters, plumbers, tradespersons, and others having ordinary skill in the art of joining two workpieces end-to-end, have had an longstanding, ongoing need for compact, light, easy-to-use devices, particularly devices that are sufficiently flexible to use on workpieces of varying cross-sections and sizes, sufficiently durable to withstand rough handling, and sufficiently stable to tightly clamp, without rotation, wobble, or other undesirable movement of the alignment devices. Moreover, the need has persisted for clamps that are simple to fabricate and operate, and quick to set up and break down, with a minimum of parts to manipulate, and a minimum of components to abuse and lose.

OBJECTS AND ADVANTAGES OF THE INVENTION

A primary object of the present invention is to simply and efficiently align and join a variety of pipe, tube, bar, fittings, and other workpieces, in a variety of sizes and cross-sections, utilizing a minimum of moving parts, a minimum of tightening tools, and a minimum of adjustments.

A related object of the invention is the alignment of workpieces in congested spaces and awkward positions, including spaces and positions where prior art devices have historically not worked well.

A third object of the invention is simplicity and economy of manufacture, using combinations of parts capable of withstanding neglect and abuse, by tradespersons and others.

A fourth object of the invention is ease of use, by operators having a wide variety of aptitude and skill, or, in some cases, having no skill at all.

Additional objects and advantages of the invention will be apparent to those skilled in the art, from the description of the invention contained herein, taken in conjunction with the attached drawings.

SUMMARY OF THE INVENTION

In one form of the invention, an clamp assembly includes a flexible member for encompassing the first workpiece, and a means, such as a locking wrench, for securing the flexible member about the first workpiece. One or more connecting workpieces are aligned to the first workpiece, using one or more alignment apparatuses. Each alignment apparatus is made up of an alignment bar assembly, a detent assembly, and at least one adjustable fastener. Each alignment bar assembly bridges the workpieces, and can slide along the flexible member. The alignment bar assembly is, in turn, held in its desired position along the flexible member, by a device such as a spring-loaded detent assembly, which, in this form of the invention, uses a spring to engage a plunger assembly with the flexible member. At least one adjustable fastener, mounted on each alignment bar assembly, exerts an alignment force on each connecting workpiece. Once aligned, the first workpiece can be joined to each successive connecting workpiece, by welding or other means.

Optionally, to prevent damage to the connecting work piece, each adjustable fastener can have a depression, in the area where the adjustable fastener contacts the connecting workpiece, also known as the fastener contact area. Further variations with this feature are possible. The adjustable fastener can have an indentation in its head, to facilitate its tightening and loosening, by a tool or other fitting. The detent assembly, optionally, can have a detent cap. The detent cap, in turn, can have an indentation at its center, to facilitate its tightening and loosening, by a tool or other fitting. The detent cap can also have a hole, to permit lubrication of the detent assembly, while excluding debris. Optionally, for ease of use, the flexible member can have a cruciform cross-section, or be colored according to a range of actual or expected first workpiece cross-sectional perimeters. Also, the plunger assembly can be hardened.

In another form of the invention, a clamp assembly includes the combination of a to flexible member, a lockable tool, and an alignment apparatus. Again, the alignment apparatus is made up of an alignment bar assembly, a detent assembly, and at least one adjustable fastener. The flexible member, in this form, is cruciform in cross-section, with a corresponding cruciform-shaped slot in the alignment bar assembly, to facilitate the sliding of the alignment apparatus on, off, or along the flexible member. A lockable tool is used here to grip and clamp, or grippingly clamp, the flexible member about the first workpiece, and secure it about the first workpiece. The alignment bar assembly contacts the first workpiece, and overlies the connecting workpiece. In this form of the invention, a detent assembly utilizes a spring, to bias a plunger assembly along a detent casing, and through an upper hole in the alignment bar assembly, causing the plunger assembly to engage the flexible member, and restraining the movement of the alignment apparatus along the flexible member. The spring biasing force can be varied, by adjusting the detent cap that restrains the spring. Each connecting workpiece is aligned with the first workpiece, using an adjustable fastener mounted on each alignment bar assembly. Once aligned, the first workpiece can be joined to each successive connecting workpiece, by welding or other means.

Optionally, to prevent damage to the connecting workpiece, each adjustable fastener can have a depression, in the area where-the adjustable fastener contacts the connecting workpiece. The adjustable fastener can have a indentation in the center of its head, or in its center shank, to facilitate its tightening and loosening, by a tool or other fitting. The detent cap, in turn, can have an indentation in its center, to facilitate its tightening and loosening, by a tool or other fitting. The detent cap can also have a hole, to permit lubrication of the detent assembly, while excluding debris.

Optionally, the flexible member can be colored according to range of actual or expected first workpiece cross-sectional perimeters, for ease of use. Also, the plunger assembly can be hardened.

In a third form of the invention, an alignment clamp assembly uses a chain, to encompass the first workpiece. The chain is attached to a locking wrench, which secures the chain about the first workpiece. The locking wrench here is removably connected to a connection area of the chain. One or more connecting workpieces are aligned to the first workpiece, using one or more alignment apparatuses. Each alignment apparatus is made up of an alignment bar assembly, a detent assembly, and at least one adjustable fastener. The alignment bar assembly, made up of an upper bar and a lower bar, can be slid on, off, or along the chain, as needed. A wedge-shaped end piece on the free end of the chain, can facilitate the sliding of the alignment bar assembly on or off the free end of the chain. The upper and lower link portions of the chain, and the projecting pivot pins of the chain, define a cruciform cross-section. This cruciform cross-section is matched by the alignment bar assembly, through the use of a slot in the upper bar, mounted on a T-shaped slot in the lower bar. The alignment apparatus is positioned on the chain using a spring-biased detent assembly, positioned inside a hole extending through the upper bar, or, in another form of the invention, positioned atop the upper bar, with a hole to accommodate the projection component of the plunger assembly. The plunger assembly slides within the detent casing, and its spring-biased projection component engages the chain. The spring is restrained by the threaded detent cap, which, in turn, may be rotated along the detent casing, to vary the spring force. One or more connecting workpieces may then be aligned with the first workpiece, and secured with the adjustable fastener mounted on each alignment bar assembly. To prevent damage to the connecting workpiece, each adjustable fastener has a depression, in the area where the adjustable fastener contacts the connecting workpiece. Once aligned, the first workpiece can be joined to each successive connecting workpiece, by welding or other means.

Optionally, the adjustable fastener can have a head indentation in its center, to facilitate its tightening and loosening, by a tool or other fitting. The detent cap, in turn, can have a cap indentation in its center, to facilitate its tightening and loosening, by a tool or other fitting. The detent cap can also have a hole, to permit lubrication of the detent assembly, while excluding debris. Optionally, the hole can be sized to not be more than approximately 1 mm (0.04 in.) in diameter. Optionally, the chain can be colored according to a range of actual or expected first workpiece cross-sectional perimeters. Also, the plunger assembly can be hardened, or can have a spring seat, to restrain lateral movement of the spring.

Subcombinations of the Alignment Clamp Assembly

Separate forms of the invention focus on the subcombination of the alignment bar assembly, the detent assembly, and the adjustable fastener, which, together, make up the alignment clamp apparatus.

In one such form, the alignment bar assembly of the alignment apparatus utilizes an upper bar having an upper slot and an upper bar hole, and a lower bar with a T-shaped groove. The upper slot and the T-shaped groove are aligned, to slidably engage a flexible member encompassing the first workpiece. In this form of the invention, the detent assembly includes a spring-biased plunger assembly and a detent cap, with a spring-biased projection into the upper slot, through the upper bar hole. The spring-biased projection engages the flexible member, while the detent cap restrains the spring, and adjusts the amount of spring force. One or more connecting workpieces may then be aligned with the first workpiece, and secured using the adjustable fastener mounted on each alignment bar assembly. Once aligned, the first workpiece can be joined to each successive connecting workpiece, by welding or other means.

Optionally, to prevent damage to the connecting workpiece, the adjustable fastener, in this form of the invention, can have a depression, where it contacts the connecting workpiece. The adjustable fastener can have a indentation in its head, to facilitate its tightening and loosening, by a tool or other fitting. The detent cap, in turn, can have a cap indentation, to facilitate its tightening and loosening, by a tool or other fitting. The detent cap can also have a hole of not more than approximately 1 mm in diameter, to permit lubrication of the detent assembly, while excluding debris. Optionally, the plunger assembly can be hardened. Also, a spring seat can be provided on the plunger assembly, to restrain the lower end of the spring.

In another form of the invention subcombination, the alignment apparatus utilizes the same combination of alignment bar assembly, detent assembly, and adjustable fastener, to slidably engage a chain encompassing the first workpiece. The alignment apparatus slidably engages the chain using an upper bar and a lower bar, more particularly, an upper slot in the upper bar, and a lower slot and lower groove, in the lower bar. A spring-loaded detent assembly is situated within the upper bar or, in another form of the invention, on the upper bar. In either form of the invention, the detent assembly includes a detent casing, and a plunger assembly. In the first case, an upper bar hole is sized to accommodate the entire detent assembly. In the latter case, the upper bar hole is sized to slidably accommodate a projection of the plunger assembly. The spring-biased plunger assembly engages the chain, while the detent cap restrains the spring, and can be used to adjust the amount of spring force. Optionally, for these two forms of the invention, a spring seat may be provided on the plunger assembly. As before, one or more connecting workpieces may then be aligned with the first workpiece, and secured using the adjustable fastener mounted on each alignment bar assembly. The adjustable fastener, in these two forms of the invention, has a depression, where it contacts the connecting workpiece, to prevent damage to the connecting workpiece. Once aligned, the first workpiece can be joined to each successive connecting workpiece, by welding or other means.

Optionally, the adjustable fastener can have a indentation in its head, to facilitate its tightening and loosening, by a tool or other fitting. The detent cap, in turn, can have an indentation, to facilitate its tightening and loosening, by a tool or other fitting. The detent cap can also have a hole of not more than approximately 1 mm in diameter, to permit lubrication of the detent assembly, while excluding debris. Optionally, the plunger assembly can be hardened. Also, a spring seat can be provided on the plunger assembly, to restrain the lower end of the spring.

Process and Method Forms

In addition to the above forms of the invention, another form of the invention may be defined, by the process used to make the alignment apparatus. An upper hole is bored in an upper bar, and a detent casing is inserted into the upper bar. The detent casing is partially threaded. An upper slot is milled in both the upper bar's lower surface, and in the detent casing. In another form of the process, the detent casing may be mounted on the upper bar, about the upper bar hole, and the upper slot is milled in the upper bar only. An overlying portion is milled, and a fastener hole is bored and threaded, in the lower bar. In addition, a lower slot and a lower groove are milled in the upper surface of the lower bar. The upper bar is mounted on the lower bar, so that the upper slot, lower slot, and lower groove will slidably accommodate a flexible member. A plunger assembly, then a spring, is inserted into the detent casing, so that its projection will engage the flexible member. A detent cap is threaded into the detent casing, to restrain the spring, and a threaded fastener is installed into the fastener hole.

Optionally, the plunger assembly may be hardened, and a cap hole, not exceeding approximately 1 mm in diameter, may be bored into the detent cap.

An additional form of the invention is disclosed through the process of color-coding a chain corresponding to a range of perimeters expected for the first workpiece. The chain is attached to a locking wrench. One or more alignment apparatuses are slid onto the chain, and the chain, with the alignment apparatuses, are mounted about the first workpiece. Each alignment apparatus is positioned about-that portion of the chain encompassing the first workpiece, and the locking wrench is locked. One or more connecting workpieces are aligned with the first workpiece, using an adjustable fastener on each alignment apparatus. The connecting workpieces are joined to the first workpiece; the locking wrench is unlocked; and the chain is released from the locking wrench, and unmounted from the first workpiece.

For a better understanding of the present invention, together with other and further objects thereof, reference is made to the following description, taken in conjunction with the accompanying drawings, and its scope will be pointed out in the appended claims.

BRIEF DESCRIPTION OF THE DRAWINGS

FIG. 1 is a perspective view, taken of an embodiment of a complete alignment clamp assembly, here securing two pipe workpieces in the vertical position. The chain clamp has been tightened around the pieces of pipe, while an added alignment apparatus has been inserted on the chain.

FIG. 2 is a top cross-section view, taken along the plane 2—2 in FIG. 1, illustrating each alignment apparatus, and its adjustable fastener component, the alignment clamp assembly utilizing three alignment apparatuses here, each having an adjustable fastener of varying configuration.

FIG. 3 is a view taken along the plane 3—3 in FIG. 2, showing a cutaway view of an embodiment of the alignment apparatus, in which the detent assembly is mounted within the upper bar of the alignment bar assembly.

FIG. 4 is a view, taken along the plane 4—4 in FIG. 3, illustrating the fastener contact area, of the adjustable fastener shown in FIG. 3.

FIG. 5 is an exploded view of the alignment apparatus depicted in FIG. 3.

FIG. 6 illustrates a perspective view, of an embodiment of an alignment clamp assembly. Here, each alignment apparatus has two adjustable fasteners. This particular embodiment is being used to vertically align two workpieces, aligning a pipe of outer diameter D', with a shaft of outer diameter D".

FIG. 7 illustrates a perspective view, of the alignment clamp assembly embodiment shown in FIG. 6. Here, this embodiment is being used to vertically align three workpieces: a pair of tubular connecting workpieces, having varying outer diameters D" and D'", respectively, with a shaft of outer diameter D'.

FIG. 8 is a cross-sectional view, of an embodiment of the alignment clamp assembly, using a quartet of alignment apparatuses, to align two solid bar workpieces of square cross-section.

FIG. 9A is a cross-sectional view of an embodiment of the alignment apparatus, in which a hand-retractable plunger is used as the adjustable fastener. This view shows the hand-retractable plunger in the contracted position, contacting the workpiece.

FIG. 9B is a cross-sectional view of the hand-retractable plunger of FIG. 9A, as it is pulled away from the workpiece, releasing it from contact with the workpiece.

FIG. 10 illustrates a variation of FIG. 3, in which the detent assembly is situated directly on the upper bar of the alignment bar assembly, and the plunger assembly is spring-biased against the upper bar.

FIG. 11 illustrates a variation of FIG. 10, in which a bearing ledge is added to the detent assembly, and the plunger assembly is spring-biased against the bearing ledge, the details otherwise being the same as in FIG. 10.

DETAILED DESCRIPTION OF EMBODIMENTS OF THE INVENTION

FIGS. 1 AND 2 depict a preferred embodiment of an alignment clamp assembly 1 in use, aligning a first confronting terminus 7 of a first workpiece 2, with a second confronting terminus 7' of a connecting workpiece 3. In FIG. 2, the first workpiece 2 is hidden behind the connecting workpiece 3.

In FIGS. 1 AND 2, the first workpiece 2, and the connecting workpiece 3, are vertical circular pipe sections. The workpieces 2, 3, 3' need not be horizontal or vertical, but may be in any position. FIG. 8 depicts the alignment clamp assembly of FIG. 1, in use on a pair of square bar workpieces 2, 3. Prior art has not shown an alignment clamp used on non-circular workpieces.

As shown in an equivalent embodiment depicted in FIG. 7, it is possible to use other, equivalent embodiments of the invention, to align more than two workpieces. Therefore, the term "connecting workpiece" should be defined to include the workpiece 3, or workpieces 3, 3', that will be aligned with the first workpiece 2, by a particular embodiment of the invention.

The embodiments set forth in this description, and in the appended claims, are capable of aligning and joining workpieces 2,3,3' having a variety of configurations. The embodiments set forth here may also be used in a variety of positions.

The term "workpiece" includes, but is not limited to, stock such as tubing, pipe, bar, shafts, handrail, and fittings. Fittings include, but are not limited to, elbows, tees, reducers, collars, stub ends, rings, weldments, and angle sections. The workpieces 2, 3, 3' to be joined need not be of the same cross-section, size, or type, nor must the workpieces 2, 3, 3' be fabricated from the same type of material.

The Flexible Member

In the embodiment of FIG. 1, a flexible member, more specifically, a chain 6, is used to secure the alignment clamp assembly 1 to the first workpiece 2, by encompassing the first workpiece 2, the first workpiece 2 here being a circular pipe. The chain 6 is preferably a metal link chain, but it is possible to substitute a flexible member made of other materials, such as plastics or composites.

While a variety of other flexible member cross-sections and configurations are possible, the preferred embodiment of FIG. 1 depicts the chain 6 with links, joined by pivot pins 38, the pivot pins 38 projecting beyond the links, the links and pins forming a cruciform chain cross-section.

Optionally, to protect the chain 6 from weld spatter, the chain 6 may be coated with nonstick compounds, such as fluoropolymer resin; epoxy; or a light coat of lubricant, among other compounds.

Just as the flexible member possesses an upper flexible member portion, and a lower flexible member portion, the chain 6 of FIG. 1, and each component link, comprises an upper link portion 34, and a lower link portion 36, both shown in FIG. 2, the lower link portion 36 being that link portion of the chain 6 positioned nearer to the first workpiece 2, as the chain 6 encompasses the first workpiece 2.

Tightening the Chain About the First Workpiece

In the preferred embodiments of FIGS. 1, 2, and 8, and the equivalent embodiments of FIGS. 6 and 7, the chain 6 is secured about the first workpiece 2, by a tool such as a locking-grip wrench, which tightens the chain 6, about the first workpiece 2. The locking wrench 10, preferably made of metal, utilizes a gripping action for tightening the chain 6, as opposed to a cranking action utilized by most of the prior art, particularly the Dearman family of patents. A gripping action is advantageous over a cranking action, where insufficient working room exists to tighten the chain 6 with a crank device. Of course, other mechanical or hydraulic devices, made of metal or other materials, could be used to tighten the chain 6 about the first workpiece 2.

The chain 6 further comprises an attached end area 40, and a free end area 42. The attached end area 40 is attached to the locking wrench 10, leaving the remainder of the chain 6 available for encompassing the first workpiece 2. An end piece 24, preferably a wedge shape, as shown in the embodiment of FIG. 1, may also be attached at the free end area 42.

The chain 6 is removably secured by the locking wrench 10 at a connection area 43, located between the attached end area 40 and the free end area 42. An encompassing section 45 is defined by that portion of the chain 6, disposed between the attached end area 40, and the connection area 43. This encompassing section 45 is used to encompass the first workpiece 2, and to secure the first workpiece 2 to the locking wrench 10.

In some cases, the chain 6 is of insufficient length to encompass the first workpiece 2. In such cases, a pivot pin 38 must be removed at a point along the chain 6, to permit addition of an extra length of chain 6, after which the pivot pin 38 is replaced, to secure the extra length of chain 6. Of course, the free end area 42, and, if present, the end piece 24, are moved to the extra length of chain 6, leaving a greater chain length available for creating the encompassing section 45.

To facilitate use of a chain 6, or other flexible member, with sufficient length to encompass the first workpiece 2, the chain 6 may be wholly colored, partially colored, colored in a variety of colors, or marked in some other fashion, each color corresponding to a particular length of chain 6, a particular size or perimeter of first workpiece 2, a particular size or perimeter of connecting workpiece 3, or a particular range of actual or expected workpiece sizes, including cross-sectional perimeters. For example, in the embodiment of FIG. 8, which uses solid bars for the first workpiece 2 and for a connecting workpiece 3, the chain 6 is shown in multiple colors, each color corresponding to a range of first workpiece 2 cross-sectional perimeters. Of course, this can be used for workpieces 2, 3 of different shapes and cross-sections.

Using the colored chain 6, shown in the embodiment of FIG. 8, the cross-sectional perimeter or size of the first workpiece 2 may be estimated, for purposes of selecting a chain 6 having sufficient length to encompass the first workpiece 2. The color coding, described above, will facilitate this process. If the first workpiece 2 cross section is variable, the cross-sectional size or perimeter can be estimated at a location near the point of confrontation between the first workpiece 2 and the connecting workpiece 3. At this point of confrontation, the first workpiece 2 will have a first confronting terminus 7, and the connecting workpiece 3 will have a second confronting terminus 7', as described below in more detail.

The Alignment Apparatus

As shown in the embodiments of FIGS. 1 & 6, an alignment apparatus 11, made up of an alignment bar assembly 12, a detent assembly 14, and an adjustable fastener 16, is used to align the first confronting terminus 7 of the first workpiece 2, and the second confronting terminus 7' of the connecting workpiece 3. The alignment apparatus 11, as a subcombination of the alignment clamp assembly 1, may be utilized separately, in conjunction with other alignment clamps of the flexible or rigid variety. The same embodiment is shown in FIG. 8, substituting square bar workpieces.

FIG. 3 offers a side view, and FIG. 5 offers an exploded view, of a preferred embodiment of the alignment apparatus 11, adapted here for slidable engagement with the chain 6.

As shown in the equivalent embodiment of FIG. 7, the alignment apparatus 11 can simultaneously align subsequent confronting termini 7', 7'"" of connecting workpieces 3, 3', thereby saving setup and breakdown time. This feature is not shown in the prior art.

In the embodiments of the drawings, the alignment apparatus 11 comprises three major components: the alignment bar assembly 12, used to help align the workpieces 2,3 (FIGS. 1, 6) 2, 3, 3' (FIG. 7); the detent assembly 14, used to secure the alignment apparatus 11 at the desired location on the chain 6; and at least one adjustable fastener 16, mounted on the alignment apparatus 11, used to apply alignment force to the connecting workpiece 3 or workpieces 3, 3'.

As described below in more detail, the alignment bar assembly 12 comprises an upper bar 44 and a lower bar 54.

The alignment bar assembly 12, the detent assembly 14, and the adjustable fastener 16 are preferably made of metal, particularly steel, but, as noted below, other materials maybe used in their fabrication. Optionally, to protect the alignment apparatus 11 from weld spatter, and to resist rusting, the alignment apparatus 11, particularly the external surfaces of the alignment bar assembly 12 and the detent assembly 14, may be coated with nonstick compounds, such as fluoropolymer resin; epoxy; or a light coat of lubricant, among other compounds. It is also possible to coat the adjustable fastener 16 in the same manner. The exposed surfaces of the alignment bar assembly 12 and the adjustable fastener 16 may be plated with zinc chromate or other compounds, to resist rust, and retard adhesion of weld spatter.

The number of alignment apparatuses 11 needed for aligning the workpieces 2, 3, 3' will vary with the size and configuration of the first workpiece 2, the size or sizes of the connecting workpieces 3, 3', and the nature of working room available, among other factors. Three alignment apparatuses 11 are shown in FIG. 2, and four alignment apparatuses are shown in FIG. 8, but greater or fewer alignment apparatuses may be used. Each alignment apparatus 11 may be slidably, and removably held, on the chain 6, as described below.

In the preferred embodiment of FIG. 1, each alignment apparatus 11 is added or subtracted by sliding it on or off the chain 6, using the end piece 24, to facilitate the sliding of each alignment apparatus 11 on or off the chain 6. In addition, an end clip 27 is preferably mounted on the end piece 24, to prevent the alignment apparatus 11 from being accidentally knocked off the chain 6.

The end piece 24, and the end clip 27, are preferably made of steel, but may be made of plastic, composites, or other suitable metallic or non-metallic materials. The metal end piece 24 is preferably stamped out of steel bar stock, but may be fabricated by casting or molding, among other methods. An end piece hole 23 is preferably stamped in the end piece 24, to accommodate the end clip 27.

In the embodiments depicted in the drawings, the alignment apparatus 11 is disposed on the first workpiece 2, by the tightening of the chain 6 about the first workpiece 2. When the chain 6 is tightened, a contacting portion 25 of the alignment bar assembly 12, is brought into contact with the first workpiece 2, leaving a remaining overlying portion 29 of the alignment bar assembly 12, to bridge the workpieces 2, 3, 3', and, more particularly, to help align the connecting workpiece 3, or connecting workpieces 3, 3', with the first workpiece 2.

The overlying portion 29 is shaped to facilitate the joining of the workpieces 2, 3, 3', and to prevent interference of the alignment bar assembly 12 with the joining operations. A fastener hole 19 is bored and threaded through the overlying portion 29, to accommodate the adjustable fastener 16, for aligning the connecting workpieces 3, 3' with the first workpiece 2.

The Alignment Bar Assembly

Looking at FIGS. 3 AND 5, the alignment bar assembly 12 comprises the upper bar. 44 and the lower bar 54. The upper bar 44 has an upper bar upper surface 46, situated away from the workpieces 2, 3, 3', and an upper bar lower surface 48, opposite the upper bar upper surface 46. A proximal upper bar end 96 is situated on the side of the first workpiece 2, and a distal upper bar end 98 is situated opposite the proximal upper bar end 96.

The lower bar 54, in turn, has a lower bar lower surface 58, comprising the contacting portion 25, which contacts the first workpiece 2. The lower bar 54 also has a lower bar upper surface 56, disposed opposite the lower bar lower surface 58. A proximal lower bar end 100 is situated on the side of the first workpiece 2, and a distal lower bar end 102 is situated opposite the proximal lower bar end 100.

As used in the embodiments shown in the drawings, the alignment bar assembly 12, and its component upper bar 44 and lower bar 54, are preferably fabricated from steel bar stock, but it is possible to substitute other types of steel, such as stainless steel (for use on titanium pipe, as an example), or other types of metal, such as brass. The alignment bar assembly 12 may also be made from other, non-metallic materials, such as plastics or composites.

The overlying portion 29 is preferably formed by milling into the lower bar lower surface 58, but may also be formed by projecting the upper bar 44 beyond the lower bar 54. The overlying portion 29 may also be formed, cast, or molded into the lower bar 54.

Of special note in this embodiment, are the configuration of the slots cut into the upper bar 44 and the lower bar 54, preferably by milling. The upper bar 44 has an upper slot 50, milled into the upper bar lower surface 48. The lower bar 54 has a T-shaped groove 60, milled into the lower bar upper surface 56. The T-shaped groove 60, in turn, comprises a lower slot 55, and a lower groove 57.

When the upper bar 44 and the lower bar 54 are joined in this preferred embodiment, the upper slot 50 and T-shaped groove 60 form a cruciform-shaped slot, to slidably accommodate the cruciform cross-section of the chain 6, as shown in FIG. 3.

A variable number of alignment bar assemblies 12 slide along the chain 6, and are used to align the first confronting terminus 7 with the second confronting terminus 7', and, as shown in the embodiment of FIG. 7 are also used to align the subsequent confronting termini 7", 7'''.

The preferred cruciform-shaped cross-section, as used in the embodiments depicted in the drawings, provides additional perimeter bearing and cross-sectional area, between the chain 6 and the alignment bar assembly 14, over the conventional rectangle-shaped or square-shaped chain cross-section described in the prior art.

Other, equivalent, cross-sectional shapes for the chain 6, and its corresponding slot, may also provide this enhanced perimeter bearing area and cross-sectional area. The additional perimeter bearing and cross-sectional area, displayed by the cruciform-shaped cross-section of these embodiments, help ensure that each alignment bar assembly 12 remains perpendicular to the chain 6, perpendicular to the tangent of the encompassing section 45 of the chain, and in bearing with the first workpiece 2. This helps prevent the rotation and wobble problems seen in prior art jackbar and bar assemblies.

As each alignment apparatus 11 slides along the chain 6, the upper link portion 34 of the chain 6 slides through the upper slot 50 of the upper bar 44, the pivot pins 38 of the chain 6 slide through the lower groove 57 of the lower bar 54, and the lower link portion 36 of the chain 6 slides through the lower slot 55 of the lower bar 54. An upper bar hole 52 in the upper bar 44 provides access to the chain 6 from the upper bar upper surface 46, and is disclosed in further detail, in the following section "The Detent Assembly".

In the embodiments depicted in FIGS. 3 AND 5, the upper bar 44 is preferably attached to the lower bar 54 with attachment screws 84. Of course, the upper bar 44 and lower bar 54 may be joined by other means, including, but not limited to, welding; soldering; contact or heat-based adhesion; casting or forming as an one-piece, integral alignment bar assembly 12; or molding as a one-piece, integral alignment bar assembly 12. The casting, forming, or molding can also incorporate the upper bar hole 52, the upper slot 50, the lower slot 55, the lower groove 57, the overlying portion 29, or combinations thereof

The Detent Assembly

In the embodiments shown in the drawings, and more particularly illustrated in the preferred embodiments depicted in FIGS. 3 AND 5, a detent assembly 14 holds the alignment apparatus 11 on the chain 6, and can be readily moved by the operator along the chain 6, yet remain in place on the chain without fasteners. The detent assembly 14 accomplishes this by utilizing a spring-biased plunger assembly 30, which engages the chain 6 through a projection 70, virtually eliminating the tightening and loosening required by prior art set screws. The only adjustment required is of the spring-bias force, which is disclosed in more detail below. While the detent assembly 14 uses spring action to engage the chain 6, it is also possible to utilize other mechanisms, such as a ratchet mechanism, to engage the chain 6, while eliminating the tightening and loosening steps mandated by the prior art.

The detent assembly 14 can have a variety of shapes, but is cylindrical, in the embodiments shown in the drawings, including the preferred embodiments of FIGS. 3 & 5, and the equivalent embodiments of FIGS. 10 & 11. The detent assembly 14 comprises one or more inner detent surfaces 62, a detent casing 15, a plunger assembly 30, a spring 78, and a detent cap 32.

In the detent assembly variations of FIGS. 3 & 11, the inner detent surfaces 62 include an upper inner axial surface 64, a lower inner axial surface 66, and a bearing ledge 68, which connects the upper inner axial surface 64 and the lower inner axial surface 66. In both embodiments, a portion of the upper inner axial surface 64 is threaded, to accommodate the detent cap 32, which is threaded to allow adjustment of the spring-bias force, as described below.

In the detent assembly variation of FIG. 10, a single, continuous inner detent surface 62 is provided. As in the detent assembly variations of FIGS. 3 & 11, a portion of the inner detent surface 62 is threaded, to accommodate the threaded detent cap 32.

Besides the projection 70, the plunger assembly 30 also comprises a top rib 72 above the projection. The top rib 72 has three primary surfaces: a top rib upper surface 74, a top rib lower surface 76, and a top rib guide surface 77. Optionally, a spring seat 83 projects above the top rib upper surface 74. The spring 78 comprises an upper spring end 80, and a lower spring end 82, opposite the upper spring end 80.

The detent cap 32 restrains the upper spring end 80, and the lower spring end 82 exerts axial spring force against the top rib upper surface 74. The top rib guide surface 77 slides along the upper inner axial surface 64, as shown in the embodiments of FIGS. 3 & 11, or along the inner detent surface 62, as shown in the embodiment of FIG. 10.

The projection 70, as a component of the plunger assembly 30, is biased by the spring 78 to engage the chain 6, and the spring seat 83 is used to laterally restrain the spring 78 on the top rib upper surface 74. Of course, it is possible for other configurations of the plunger assembly 30, to be used on the chain 6, or to be used on other forms of the flexible member.

In the embodiments of FIGS. 3, 5, & 11, the detent casing 15 is preferably fabricated from steel tubing, having an inner diameter equivalent to that of the lower inner axial surface 66. The upper inner axial surface 64, being of greater diameter, is created by boring into the tubing.

In the embodiment of FIG. 10, the detent casing 15 is also preferably fabricated from steel tubing, having an inner diameter equivalent to that of the continuous inner detent surface 62.

It is possible to fabricate the detent casing 15 by making one or more borings into a solid piece of raw material. While steel is the preferred material for the detent casing 15 in these embodiments, stainless steel, brass, and other metals may also be used. It is also possible to make the detent casing of nonmetallic materials, such as plastics or composites. Finally, the detent casing 15 may be fabricated by integral casting, molding, or forming.

As used in the embodiments shown in the drawings, the plunger assembly 30 is preferably made of hardened steel, although other metals, such as stainless steel and brass, or other durables material, including plastics or composites, would suffice. The spring 78 is preferably made from steel, although any elastic metal, or other elastic material would suffice. The detent cap 32 is preferably made of steel, although other materials, such as other metals, or plastics, or composites, would also suffice.

Detent Assembly Variation—FIG. 3

FIG. 3, shown exploded in FIG. 5, illustrates a preferred embodiment of the detent assembly 14, in which the upper bar hole 52 is sized to accommodate the entire detent assembly 14. This embodiment utilizes a press-fit, or interference-fit, installation of the detent casing 15 in the upper bar hole 52, as known to persons with ordinary skill in the art.

For the preferred metal upper bar 44 and metal detent casing 15, the installation may be made by boring the upper bar hole 52, to a diameter smaller than the outer diameter of the detent casing 15. The upper bar hole 52 diameter here may be 0.001 inches (0.0000254 m) smaller than the outer diameter of the detent casing 15, or even smaller still. This will overcome the effects of temperature changes on the metals, which might cause the detent casing 15 to shrink out of the upper bar hole 52.

It is also possible to thread the upper bar hole 52, and the corresponding section of the detent casing 15, to utilize a screw-in installation.

In the embodiment of FIG. 3, the detent casing 15 comprises three inner detent surfaces: the upper inner axial surface 64, the lower inner axial surface 66, and the bearing ledge 68, which connects the upper inner axial surface 64 and the lower inner axial surface 66. A portion of the upper inner axial surface 64 is threaded to accommodate the threaded detent cap 32, which allows adjustment of the spring-bias force. The upper inner axial surface 64, particularly its unthreaded portion, laterally restrains the spring 78, and slidably accommodates the top rib guide surface 77.

The lower inner axial surface 66 slidably accommodates the projection 70, and, in the embodiment of FIG. 3, is of smaller diameter than the diameter of the upper inner axial surface 64. The bearing ledge 68 connects the upper inner axial surface 64, and the lower inner axial surface 66. The top rib lower surface 76 of the plunger assembly 30, is biased by the spring 78 against the bearing ledge 68, and the projection 70 is biased by the spring 78, along the lower inner axial surface 66, to engage the chain 6. The undulating surfaces of the upper link portion 34 of the chain 6, shown in FIGS. 2 & 8, facilitate this engagement of the chain 6.

While it is possible to attach the detent cap 32 to the detent casing 15 by other means, a threaded engagement of the detent casing 15 with the detent cap 32, shown in this embodiment, allows the detent cap 32 to be rotated within the detent casing 15. This lengthens or shortens the spring 78, adjusting the amount of axial force used to bias the top rib lower surface 76 against the bearing ledge 68, and adjusting the amount of axial force, used to bias the projection 70 in engaging the chain 6.

While other features are possible, two features, not shown in the prior art, are added to the embodiment of FIG. 3, to facilitate the action of the detent cap 32.

First, the detent cap 32 has a cap hole 33, sufficiently large to admit a drop or more of lubricant, to the to the inner detent surfaces, including the upper inner axial surface 64, the lower inner axial surface 66, and the bearing ledge 68; and, if desired, to the plunger assembly 30, and the spring 78. The cap hole 33, is also sized to exclude debris and foreign material, such as dirt, or weld spatter. A cap hole 33 diameter of approximately 1 mm (0.04 in.) diameter has been found to work, though the cap hole 33 diameter may be varied, especially if multiple holes, a larger detent assembly 14, or a more viscous lubricant is used.

Second, the detent cap 32 has a cap indentation 21 at its center, to facilitate the rotation of the detent cap 32 and the adjustment of the axial spring force. In this embodiment, the cap indentation 21 is hexagonal, to admit a hexagonal wrench, but, of course, other shapes and configurations of indentations are possible.

Detent Assembly Variation—FIG. 10

FIG. 10 depicts an equivalent embodiment of the invention, in which the detent assembly 14 is mounted on the upper bar 44 of the alignment bar assembly 12, as opposed to being disposed in the upper bar hole 52, as was done in the embodiment of FIG. 3. In the embodiment of FIG. 10, the upper bar hole 52 is sized to slidably accommodate the projection 70, as opposed to accommodating the detent casing 15 as a whole. In this embodiment, the detent casing 15 is welded to the upper bar upper surface 46, but it is possible to join the detent casing 15 to the alignment bar assembly 12, more particularly, to the upper bar 44, by other means, including, but not limited to, welding, soldering, contact adhesion, integral casting, or integral molding.

Unlike the embodiment of FIG. 3, the embodiment of FIG. 10 depicts the detent casing 15, having a constant inner diameter throughout its length, thereby having a single, continuous inner detent surface 62, and no bearing ledge 68. This continuous inner detent surface 62 laterally restrains the spring 78.

The continuous inner detent surface 62, particularly its unthreaded portion, laterally restrains the spring 78, and slidably accommodates the top rib guide surface 77 of the plunger assembly 30. The top rib lower surface 76 of the plunger assembly 30 is biased by the spring 78 against the upper bar upper surface 46, and the projection 70 is biased by the spring 78, and through the upper bar hole 52, to engage the chain 6. The undulating surfaces of the upper link portion 34 of the chain 6, shown in FIGS. 2 & 8, facilitate this engagement of the chain 6.

While it is possible to attach the detent cap 32 to the detent casing 15 by other means, a threaded engagement of the detent casing 15 with the detent cap 32, shown in this embodiment, allows the detent cap 32 to be rotated within the detent casing 15. This lengthens or shortens the spring 78, adjusting the amount of axial force used to bias the top rib lower surface 76 against the upper bar upper surface 46, and adjusting the amount of axial force, used to bias the projection 70 in engaging the chain 6.

The upper bar hole 52 slidably accommodates the projection 70, and, in this is embodiment, is of smaller diameter than the upper inner axial surface 64. In addition, the upper bar hole of this embodiment extends from the upper bar upper surface 46 to the upper slot 50.

While other features are possible, two features, not shown in the prior art, are added in FIG. 10, to facilitate the action of the detent cap 32.

First, the detent cap 32 has a cap hole 33, sufficiently large to admit a drop or more of lubricant, to the continuous inner detent surface 62 and, if desired, to the plunger assembly 30, and to the spring 78. The cap hole 33, is also sized to exclude debris and foreign material, such as dirt, or weld spatter. A cap hole 33 diameter of approximately 1 mm diameter (0.04 in.) has been found to work, though the cap hole 33 diameter may be varied, especially if multiple holes, a larger detent assembly 14, or a more viscous lubricant is used.

Second, the detent cap 32 has a cap indentation 21 at its center, to facilitate the rotation of the detent cap 32 and the adjustment of the axial spring force. In this embodiment, the cap indentation 21 is hexagonal, to admit a hexagonal wrench, but, of course, other shapes and configurations of indentations are possible.

Detent Assembly Variation—FIG. 11

FIG. 11 depicts an equivalent embodiment of the invention, in which the detent assembly 14 is mounted on the upper bar 44 of the alignment bar assembly 12, as in FIG. 10. The upper bar hole 52 is, again, sized to slidably accommodate the projection 70, as opposed to accommodating the detent casing 15 as a whole. In this embodiment, the detent casing 15 is welded to the upper bar upper surface 46, but it is possible to join the detent casing 15 to the alignment bar assembly 12, more particularly, to the upper bar 44, by other means, including, but not limited to, welding, soldering, contact adhesion, integral casting, or integral molding.

The detent casing 15, as shown in the embodiment of FIG. 11, comprises three inner detent surfaces 62, as in the embodiment of FIG. 3: the upper inner axial surface 64, the lower inner axial surface 66, and the bearing ledge 68, which connects the upper inner axial surface 64 and the lower inner axial surface 66. A portion of the upper inner axial surface 64 is threaded, to accommodate the threaded detent cap. 32, as shown in FIG. 10, which allows adjustment of the spring-bias force .The upper inner axial surface 64 laterally restrains the spring 78, and slidably accommodates the top rib guide surface 77.

The embodiment of FIG. 11 depicts a lower inner axial surface 66 having a length less than, or equal to, the thickness of the detent casing 15. Such a configuration would be amenable to fabrication, by allowing use of raw material in an open-box-like or open-can-like shape, in addition to the earlier-stated uses of tubular or solid raw materials. It is, of course, possible to lengthen the lower inner axial surface 66, shorten the upper inner axial surface 64, and still mount the detent assembly 14 on the upper bar 44 of the alignment bar assembly 12.

In the embodiment of FIG. 11, the lower inner axial surface 66, and the upper bar hole 52, slidably accommodates the projection 70, and, are of smaller diameter than the upper inner axial surface 64. The top rib lower surface 76 of the plunger assembly 30, is biased by the spring 78 against the bearing ledge 68. The projection 70 is biased by the spring 78, along the lower inner axial surface 66, and through the upper bar hole 52, to engage the chain 6. The undulating surfaces of the upper link portion 34 of the chain 6, shown in FIGS. 2 & 8, facilitate this engagement of the chain 6.

While it is possible to attach the detent cap 32 to the detent casing 15 by other means, a threaded engagement of the detent casing 15 with the detent cap 32, as in FIGS. 3 & 10, allows the detent cap 32 to be rotated within the detent casing 15. This lengthens or shortens the spring 78, adjusting the amount of axial force used to bias the top rib lower surface 76 against the bearing ledge 68, and adjusting the amount of axial force used to bias the projection 70, through the upper bar hole 52, through the lower inner axial surface 66, and against the chain 6.

While other features are possible, two features, not shown in the prior art, are added to the embodiment of FIG. 11, to facilitate the action of the detent cap 32, as shown in FIGS. 3 & 10.

First, the detent cap 32 has a cap hole 33, sufficiently large to admit a drop or more of lubricant, to the inner detent surfaces, including the upper inner axial surface 64, the lower inner axial surface 66, and the bearing ledge 68, and, if desired, to the plunger assembly 30, and the spring 78. The cap hole 33, is also sized to exclude debris and foreign material, such as dirt, or weld spatter. A cap hole 33 diameter of approximately 1 mm (0.04 in.) diameter has been found to work, though the cap hole 33 diameter may be varied, especially if multiple holes, a larger detent assembly 14, or a more viscous lubricant is used.

Second, the detent cap 32 has a cap indentation 21. In this embodiment, the cap indentation 21 is hexagonal, to admit a hexagonal wrench or Allen wrench, but, of course, other shapes and configurations of indentations are possible.

Alignment of the Connecting Workpiece or Workpieces

As shown in the embodiment of FIGS. 1, 2, AND 8, the encompassing section 45 of the chain 6 is placed about the first workpiece 2, in an area adjacent to the first confronting terminus 7. The chain 6, with its alignment apparatuses 11, is removably secured by the locking wrench 10 at the connection area 43. The connection area 43 is secured to the locking wrench 10, in a corresponding notch 106 on the locking wrench 10.

The operator then grips the locking wrench 10, without locking it, and turns the locking wrench 10 and chain 6 about the first workpiece 2, to obtain the most advantageous location for tightening the locking wrench 10, as permitted by the available workspace. The chain 6 must be positioned on the first workpiece 2, so that the adjustable fasteners 16 on the alignment bar assembly 12 can contact the connecting workpiece 3 or workpieces 3, 3'.

Each alignment apparatus 11 is preferably positioned at approximately equal distances along the encompassing section 45 of the chain 6. This may be varied, however, depending on the available working area, and on the size and nature of workpieces 2, 3, 3' to be joined. Each alignment apparatus 11 may still be moved along the chain 6, to a position deemed ideal by the operator.

A wrench screw 86 is adjusted as necessary, to ensure proper locking action of the locking wrench 10. The operator fully grips the locking wrench 10, to lock the locking wrench 10 in a secured position, sufficient to bring each alignment apparatus 11 into contact with the first workpiece 2, at each contacting portion 25.

When the chain 6 is tightened about the first workpiece 2, the contacting portion 25 is brought to bear against the first workpiece 2, leaving the overlying portion 29, to help align the connecting workpiece 3, or workpieces 3, 3', with the first workpiece 2, preparatory to their joining at their confronting termini 7, 7' and 7", 7'", respectively.

The alignment is made using at least one adjustable fastener 16, mounted on each alignment bar assembly 12. The adjustable fastener 16 may be a bolt, a screw, a plunger, or other type of fitting, which can be adjusted to align each connecting workpiece 3, 3'.

The embodiments of FIGS. 1–8 utilize a modified knurled-head screw as the adjustable fastener 16. The alternative embodiment of FIGS. 9A & 9B utilizes a spring-loaded, hand-retractable plunger 88 as the adjustable fastener 16. The latter can be used to minimize adjustment time, where a series of identical or similar connecting workpieces 3, 3' are to be joined.

The adjustable fastener 16, as shown in the embodiments of FIGS. 1–8, comprises a fastener shank 17, a fastener head 18, and a fastener contact area 28 opposite the fastener head 18, for contacting the connecting workpiece 3, 3'. The fastener shank 17 exists in threaded engagement with the fastener hole 19. The fastener contact area 28 is situated on the adjustable fastener 16, on the side radially inward toward the axis of the first workpiece 2.

The fastener contact area 28 may, among other shapes, be semi-pointed, as shown on the preferred embodiment of FIG. 3, and is modified as noted below. The fastener contact area may also be padded or footed.

The fastener head 18 is shown in alternative, equivalent circular and annular shapes, as shown in the embodiments of FIG. 2. The top adjustable fastener 16 and the lower right-hand adjustable fastener 16 of FIG. 2 have an annular fastener head 18. An annular fastener head 18 is also depicted in FIG. 3. A circular fastener head 18 is depicted in the lower left hand adjustable fastener 16 of FIG. 2. If a circular fastener head 18 is used, the fastener shank 17 will end at the fastener head 18. If an annular fastener head 18 is used, the fastener shank 17 will extend through the annular fastener head 18. A modified annular fastener head is also possible, to permit the fastener shank 17 to partially extend into the fastener head. The fastener shank 17 is fully threaded in the lower right-hand adjustable fastener 16 of FIG. 2, and partially threaded in the remaining adjustable fasteners 16 of FIG. 2.

The adjustable fastener 16 and its components are preferably made of steel. A stainless steel adjustable fastener 16 is preferred, when used on titanium or other specialty metals. Other metals, such as brass, may also be used, as well as nonmetals, such as plastics, composites, or wood. The fastener head 18 is preferably made from bar stock, if made of steel or brass.

As shown in the preferred embodiment of FIG. 1, and the equivalent embodiment of FIG. 6, after the workpieces 2, 3, are positioned so that the confronting termini 7, 7' are brought into close proximity with each other, each adjustable fastener 16 is rotated as needed, to exert alignment force on the connecting workpiece 3, and align the second confronting terminus 7' of the connecting workpiece 3 with the first confronting terminus 7 of the first workpiece 2.

As shown in the equivalent embodiment of FIG. 7, each adjustable fastener 16 is rotated as needed, to exert alignment force on the connecting workpieces 3, 3', aligning the second confronting terminus 7' of the connecting workpiece 3 with the first confronting terminus 7 of the first workpiece 2, and aligning the subsequent confronting termini 7", 7'" of each connecting workpiece 3,3'. In this embodiment, the two sets of confronting termini 7, 7' and 7", 7'" should be in close proximity to each other, before tightening the adjustable fastener 16.

Two features of the adjustable fastener 16, shown in the preferred embodiments of FIGS. 3 & 4, represent an advance over the prior art. First, in order to minimize the possibility of damage to the connecting workpiece 3, 3', and slippage of the connecting workpiece 3, 3', a depression 22 is made in the fastener contact area 28, as shown in FIG. 4. In the embodiment of FIG. 4, the depression 22 is circular in shape, although other shapes and configurations are possible. The depression 28 may be made by drilling, cutting, integral forming, integral casting, integral forming, or other means, and may be made before, during, or after the shaping of the contact area 28.

Second, the embodiments depicted in FIGS. 1, 2, 6, AND 7 illustrate adjustable fasteners 16 having a head indentation 20 in the center of each fastener head 18, for accommodation of a headed wrench, such as a hexagonal wrench. The hexagonal wrench, or other headed wrench, may be used to further tighten, or to loosen, the adjustable fastener 16.

If an annular fastener head 18 is used, the head indentation 20 may be formed, cast, cut, or bored into a shank head 104 of the fastener shank 17. For a non-annular fastener head 18, as shown in the top and lower left adjustable fasteners 16 of FIG. 2, the head indentation 20 may be formed, cast, cut, or bored into the fastener head 18. It is also possible to fabricate the head indentation 20, while forming or casting the adjustable fastener 16 as an integral unit.

The head indentation 20 may be created by other means. For instance, a set screw, of hardened metal, can be used as the fastener shank 17, as depicted in the embodiment of FIG. 2, lower right-hand corner. The annular fastener head 18, in that instance, would be fabricated of a metal having a softer grade than the set screw. After the fastener head 18 is installed on the fastener shank 17, the portion of the annular fastener head 18, adjacent to the fastener shank 17, is peened against the shank head 104, to lock the fastener shank 17 against the annular fastener head 18, and prevent differential movement of the fastener shank 17, with respect to the annular fastener head 18. Of course, other means are possible to prevent such differential movement.

It is possible to utilize more than one adjustable fastener 16 per alignment apparatus 11. FIGS. 6 AND 7 illustrate equivalent embodiments having two adjustable fasteners 16 per alignment apparatus 11. It is possible, of course, to utilize a greater number of adjustable fasteners 16 per alignment apparatus 11.

The embodiment illustrated in FIG. 6 uses multiple adjustable fasteners 16 on each. alignment apparatus 11, to align the connecting workpiece 3 with the first workpiece 2. This may be desirable when a finer adjustment is desired during the alignment process, or when the operator needs to align a connecting workpiece 3 that will veer away from the axis of the first workpiece 2. Apart from the use of multiple adjustable fasteners 16, the structure of this embodiment is similar to the structure of the preferred embodiment of FIG. 1.

The embodiment illustrated in FIG. 7 uses multiple adjustable fasteners 16 on each alignment apparatus 11,to align two connecting workpieces 3, 3' with the first workpiece 2. This can eliminate the steps of repositioning the chain 6, locking wrench 10, and alignment apparatuses 11 on connecting workpieces 3, 3', as they are joined together.

In the embodiment of FIG. 7, the alignment clamp assembly 1 is secured about the first workpiece 2. The second confronting terminus 7'of the connecting workpiece 3 is aligned with the first confronting terminus 7 of the first workpiece 2, using the adjustable fastener 16 located closest to the detent assembly 14.

The subsequent connecting workpiece 3', and its subsequent confronting terminus 7''', are then aligned with the corresponding subsequent confronting terminus 7" of the connecting workpiece 3, using the remaining adjustable fastener 16. These confronting termini 7, 7' and 7", 7''' need not be aligned in any particular sequence.

As depicted in the alternative embodiment of FIGS. 9A & 9B, a spring-loaded, hand-retractable plunger 88 may be substituted as the adjustable fastener 16. As used in FIGS. 9A & 9B, the hand-retractable plunger 88 utilizes a smooth plunger shank 94 having a plunger head 93, the smooth plunger shank 94 having two or more plunger props 90. The smooth plunger shank 94 is spring-biased against, and positioned within, a threaded plunger shank 92, as shown in FIG. 9A. The threaded plunger shank 92, is, in turn, threadedly engaged with the fastener hole 19 in this embodiment. The smooth plunger shank 92 has a fastener contact area 28, which may have a depression 22. As shown in FIG. 9A, the plunger props 90 recede into corresponding plunger slots 95 on the threaded plunger shank 92, when the smooth plunger shank 94 is biased against the threaded plunger shank 92. The plunger slot 95 is more clearly shown with the plunger prop 90 withdrawn, as in FIG. 9A.

As seen in FIG. 9B, the smooth plunger shank 94 may be pulled away from the threaded plunger shank 92, and turned so that the plunger props 90 rest atop the threaded plunger shank 92, instead of their biased position within the plunger slots 95. This, in turn, releases the fastener contact area 28 from contact with the connecting workpiece 3, 3'. When the smooth plunger shank 94 is biased against the threaded plunger shank 92, as shown in FIG. 9A, the plunger props 90 are used to bear against the threaded plunger shank 92, in the plunger slots 95, permitting the fastener contact area 28 to contact the connecting workpiece 3, 3' and allowing the hand-retractable plunger 88 to be turned as a single unit.

Fabrication of an Alignment Apparatus

Referring to FIG. 3, which illustrates a preferred embodiment of an alignment apparatus 11, elaborated upon in FIG. 5, the alignment bar assembly 12 of this embodiment can be fabricated by cutting pieces from metal bar stock, to form the upper bar 44, and the lower bar 54. Other means of fabrication are possible, as discussed in the above section "The Alignment Bar Assembly", of this disclosure. Where grooves, slots, and surfaces must be cut from from metal stock, it is preferable to mill these grooves, slots, and surfaces.

The upper bar hole 52 is bored through the upper bar 44, to accommodate the detent assembly 14, as shown in the embodiment of FIG. 3, or to slidably accommodate the projection 70, as shown in the embodiments of FIGS. 10 AND 11. It is of course, possible to integrally cast or mold the upper bar hole 52 into the upper bar 54.

The overlying portion 29 is preferably formed by milling into the lower bar lower surface 58, but may also be formed by projecting the upper bar 44 beyond the lower bar 54. The overlying portion 29 may also be formed, cast, or molded into the lower bar 54.

In the embodiments depicted in FIGS. 3, 5, 10 & 11, the lower slot 55 and the lower groove 57 are milled into the lower bar upper surface 56. Each threaded fastener hole 19 is bored and threaded through the overlying portion 29. It is, of course, possible to integrally cast or mold these features into the lower bar 54.

In the embodiment of FIG. 3, the detent casing 15 is inserted into the upper bar hole 52, as described in the section of this disclosure titled "Detent Assembly Variation—FIG. 3". After this, the upper slot 50 is milled, into the lower bar lower surface 48 and the detent casing 15. While this sequence is not required, this offers the advantage of one milling operation, as opposed to separate milling operations, for the detent casing 15 and the upper bar 44. A portion of the upper inner axial surface 64 is threaded, to engage the threaded detent cap 32. It is, of course, possible to integrally cast or mold the upper slot 50 with the upper bar 44, the detent casing 15, or both.

In the embodiments of FIGS. 10 AND. 11, the detent casing 15 is welded to the upper bar 44. However, it is possible to join the detent casing 15 to the alignment bar assembly 12, more particularly, to the upper bar 44, by other means, including, but not limited to, welding, soldering, contact adhesion, integral casting, or integral molding, as described above, in the sections of the disclosure labeled "Detent Assembly Variation—FIG. 10", AND "Detent Assembly Variation—FIG. 11".

In the embodiment of FIGS. 10 AND 11, the upper slot 50 is milled in the upper bar lower surface 48, and a portion of the continuous inner detent surface 62 of FIG. 10, or the upper inner axial surface 64 of FIG. 11, is threaded, to engage the threaded detent cap 32. It is, of course, possible to integrally cast or mold the upper slot 50 with the upper bar 44, the detent casing 15, or both.

In the embodiments depicted in FIGS. 3, 5, 10, & 11, the upper bar 44, and the lower bar 54, are joined to slidably accommodate the chain 6, and to permit the projection 70 to engage the chain 6, as disclosed above.

After the plunger assembly 30 is hardened, the plunger assembly 30 is inserted into the detent casing 15, so that the projection will project into the upper slot 50, and, optionally, the T-shaped groove 60, to engage the chain 6. The spring 78 is installed, then the detent cap 32, to secure the spring.

The spring force may be adjusted, by rotating the detent cap 32 within the threaded portion of the detent casing 15. Optionally, a hand wrench, such as a hexagonal wrench, may be used to engage the cap indentation 21, and turn the detent cap 32. The adjustable fastener 16 is installed by rotating within the fastener hole 19.

No specific order is dictated for the above steps, as depicted in these embodiments, except that the plunger assembly 30 should be inserted in the detent casing 15, after the upper slot 50 is milled, to avoid damage to the projection 70. In addition, the detent cap 32 will typically be installed after the spring 78 is installed.

It should be noted that the detent assembly 14 may be fabricated in its entirety, before mounting on or in the upper bar 44. In addition, it is possible to form the upper bar 44, the lower bar 54, the detent casing 15, or any combination of these components, by integral casting, forming, or molding, and by other methods known to those with skill in the art.

Disassembly of the Alignment Clamp Assembly

In the embodiments shown in the drawings, upon completion of the alignment and joining operation, the locking wrench 10 is unlocked, the connection area 43 of the chain 6 is released from the notch 106, and the encompassing section 45, including the alignment apparatuses 11, is unmounted from the first workpiece 6.

If warranted, the end clip 27 is removed from the chain 6, and excess alignment apparatuses 11 are slid off the chain 6. If additional sections of chain 6 were added, and are no longer needed, they are removed by removing a pivot pin 38, taking care to retain any color coding of the chain 6. The end piece 24 and the end clip 27 are taken off any newly-removed additional sections of chain 6, then replaced on the free end area 42 of the chain 6, and the alignment clamp is ready for its next use.

Where a hand retractable plunger 88 is used, after completion of the permanent joining operation, the smooth plunger shank 94 is pulled against the spring bias, turned in either direction, and released, causing the plunger props 90 to bear against the threaded plunger shank 92, as shown in FIG. 9B.

If the alignment apparatus 11 is then used to align a new connecting workpiece 3, 3' of similar size, the hand-retractable plunger 88 is brought into contact with the connecting workpiece 3, 3', by rotating the smooth plunger shank 94, and allowing the spring bias to engage each plunger prop 90 with its plunger slot 95, and the fastener contact area 28 with the new connecting workpiece 3, 3'. This will change the position of the hand-retractable plunger 88 from the view shown in FIG. 9B, to the view shown in FIG. 9A. When used in this fashion, the invention can align later, similarly-sized connecting workpieces 3, 3', with minimal adjustments.

Additional Embodiments not Disclosed Above

In some situations, tight working space, or a short first workpiece 2, will allow insufficient room for the alignment apparatus 11, as shaped in the embodiments of FIGS. 3 AND 5. In such situations, the lower bar 54 may be further shortened, so that the proximal lower bar end 100 and the proximal upper bar end 96 are aligned. The fabrication and operation of this embodiment is, otherwise, similar to the fabrication and operation of the embodiments of the invention disclosed above.

The upper bar 44, as well as the lower bar 54, may be lengthened or deepened for enhanced rigidity. Either or both bars 44, 54 may also be widened, for greater stability on larger workpieces. The distance between the lower slot 55 and the lower bar lower surface 58 may also be increased, for enhanced stability.

Conclusions, Ramifications, and Scope

Summarizing, it will be seen that the invention, as disclosed in the above embodiments, and their equivalents, offers significant advantages over the prior art, due to its simplicity, flexibility, compactness, and ease of use, in spite of prior art teaching in the opposite direction. It can work on a variety of objects, in a variety of shapes and sizes. It can be assembled from a minimum of parts, and requires a minimum of parts and tools to operate. It requires little or no skill to use. Moreover, it is well-suited for use on small objects, and for use in congested spaces, where prior art clamps and clamp assemblies would not fit.

While the above description contains a number of preferred embodiments, as well as variations and equivalents on these preferred embodiments, they should not be construed as limitations on the scope of the invention, but as an exemplification of several embodiments thereof. The above embodiments have been presented for purposes of illustration and description, and are not intended to be exhaustive, nor are they intended to limit the invention to the precise form disclosed. This description was selected to best explain the principles of the invention, and the practical application of these principles, to enable others skilled in the art to best utilize the invention, in various embodiments, and various modifications, as are suited to the particular use contemplated. Those skilled in the art will recognize that other and further changes and modifications may be made thereto, without departing from the spirit of the invention, and it is intended to claim all such changes in modifications, as fall within the true scope of the invention. It is intended that the scope of the invention not be limited by the specification, but be defined by the claims set forth below.

1 alignment clamp assembly
2 first workpiece
3 connecting workpiece
3' connecting workpiece
6 chain
7 first confronting terminus
7' second confronting terminus 7″ subsequent confronting terminus
7‴ subsequent confronting terminus
10 locking wrench
11 alignment apparatus
12 alignment bar assembly
14 detent assembly
15 detent casing
16 adjustable fastener
17 fastener shank
18 fastener head
19 fastener hole
20 head indentation
21 cap indentation
22 depression
23 end piece hole
24 end piece
25 contacting portion
27 end clip
28 fastener contact area
29 overlying portion
30 plunger assembly
32 detent cap
33 cap hole
34 upper link portion
36 lower link portion
38 pivot pin
40 attached end area
42 free end area
43 connection area
44 upper bar
45 encompassing section
46 upper bar upper surface
48 upper bar lower surface
50 upper slot
52 upper bar hole
54 lower bar
55 lower slot
56 lower bar upper surface
57 lower groove
58 lower bar lower surface
60 T-shaped groove
62 inner detent surface
64 upper inner axial surface
66 lower inner axial surface
68 bearing ledge
70 projection
72 top rib
74 top rib upper surface
77 top rib guide surface
78 spring
80 upper spring end
82 lower spring end
83 spring seat
84 attachment screws
85 screw head
86 wrench screw
88 hand-retractable plunger
90 plunger prop
92 threaded plunger shank
93 plunger head
94 smooth plunger shank
95 plunger slot
96 proximal upper bar end
98 distal upper bar end
100 proximal lower bar end
102 distal lower bar end
104 shank head
106 notch

What is claimed is:

1. A clamp assembly for aligning a first workpiece, and at least one connecting workpiece, the clamp assembly comprising:
   (a) a flexible member encompassing the first workpiece;
   (b) means for securing the flexible member about the first workpiece;
   (c) an alignment apparatus, comprising
      (i) an alignment bar assembly,
         A. said alignment bar assembly bridging the first workpiece, and the connecting workpiece,
         B. the alignment bar assembly being slidably disposed along the flexible member,
      (ii) a detent assembly,
         A. said detent assembly being connected to the alignment bar assembly,
         B. the detent assembly comprising a plunger assembly,
         C. the plunger assembly being in spring-biased engagement with the flexible member, and
      (iii) at least one adjustable fastener,
         A. said adjustable fastener being mounted on the alignment bar assembly,
         B. the adjustable fastener exerting an alignment force on the connecting workpiece.

2. The clamp assembly of claim 1, wherein the adjustable fastener has a fastener contact area for contacting the workpiece, the contact area having a depression.

3. The clamp assembly of claim 2, the detent assembly further comprising a detent cap, the detent cap having a cap hole of sufficient size to permit lubrication, while excluding debris.

4. The clamp assembly of claim 2, wherein the flexible member has a cruciform-shaped cross-section.

5. The clamp assembly of claim 2, wherein the flexible member is colored according to a range of cross-sectional perimeters of the first workpiece.

6. The clamp assembly of claim 2, wherein the plunger assembly is hardened.

7. The clamp assembly of claim 2, wherein the adjustable fastener has a fastener head, the fastener head having a head indentation at its center.

8. The clamp assembly of claim 2, wherein the detent cap has a cap indentation at its center.

9. A clamp assembly for aligning a first workpiece, and at least one connecting workpiece, the clamp assembly comprising:
   (a) a flexible member encompassing the first workpiece, said flexible member having a cruciform cross-section;
   (b) a lockable tool for grippingly clamping the flexible member about the first workpiece; and
   (c) an alignment apparatus, comprising
      (i) an alignment bar assembly,
         A. the alignment bar assembly having a cruciform-shaped slot,
         B. the alignment bar assembly contacting the first workpiece, and overlying the connecting workpiece,
         C. the alignment bar assembly being slidably disposed along the flexible member, through the cruciform-shaped slot,
         D. the alignment bar assembly having an upper hole (ii) a spring-biased detent assembly, the detent assembly comprising
  A. a detent casing,
  B. a plunger assembly, slidably engaged with the detent casing, the plunger assembly having a projection,
  C. a spring, the spring having an upper spring end and a lower spring end, and
  D. a detent cap,
  E. the detent cap variably restraining the upper spring end,
  F. the lower spring end exerting a spring-biased force on the plunger assembly,
  G. causing the projection to be in spring-biased engagement with the flexible member, through the upper hole, and
(iii) at least one adjustable fastener mounted on the alignment bar assembly, and exerting an alignment force on the connecting workpiece.

10. The clamp assembly of claim 9, wherein the adjustable fastener has a radially-inward fastener contact area, the fastener contact area having a depression.

11. The clamp assembly of claim 9, wherein the detent cap has a cap indentation at its center.

12. The clamp assembly of claim 9, wherein the adjustable fastener has a circular fastener head, said fastener head having an indentation at its center.

13. The clamp assembly of claim 9, wherein the adjustable fastener has
  (a) an annular fastener head,
  (b) a fastener shank, the fastener shank having a shank head disposed within the annular fastener head,
  (c) the shank head having a head indentation.

14. The clamp assembly of claim 9, wherein the detent cap has a cap hole of sufficient size to permit lubrication, while excluding debris.

15. The clamp assembly of claim 9, wherein the plunger assembly is hardened.

16. The clamp assembly of claim 9, wherein the flexible member is colored according to a range of cross-sectional perimeters of the first workpiece.

17. An alignment clamp assembly, for aligning a first workpiece, and at least one connecting workpiece, the alignment clamp assembly comprising:
  (a) a chain, the chain comprising
    (i) an upper link portion,
    (ii) a lower link portion,
    (iii) a plurality of pivot pins projecting from opposite sides of the chain,
    (iv) an attached end area,
    (v) a free end area,
    (vi) a wedge-shaped end piece, the end piece removably attached to the free end area of the chain,
    (vii) a connection area, the connection area located between the attached end area and the free end area, and
    (viii) an encompassing section, formed by the chain between the attached end area and the connection area, the encompassing section encompassing the first workpiece;
  (b) a locking wrench, the locking wrench attached to the attached end area of the chain, and removably connected to the connection area of the chain;
  (c) an alignment apparatus, the alignment apparatus comprising
    (i) an alignment bar assembly, the alignment bar assembly comprising
      A. an upper bar, the upper bar comprising
        1. an upper bar upper surface, and
        2. an upper bar lower surface, the upper bar lower surface having an upper slot,
        3. the upper bar having an upper bar hole, and
      B. a lower bar, the lower bar comprising
        1. a lower bar upper surface, the lower bar upper surface having a lower slot and a lower groove, and
        2. a lower bar lower surface,
      C. the alignment bar assembly being oriented transverse to the link chain,
      D. the upper bar being mounted on the lower bar, such that
        1. the upper slot slidably accommodates the upper link portion of the chain,
        2. the lower slot slidably accommodates the lower link portion of the chain, and
        3. the lower groove slidably accommodates the pivot pins of the chain;
    (ii) a spring-loaded detent assembly disposed in the upper bar hole of the alignment bar assembly, the detent assembly comprising
      A. a detent casing, the detent casing comprising
        1. an upper inner axial surface,
        2. a lower inner axial surface, and
        3. a bearing ledge,
        4. the bearing ledge connecting the upper inner axial surface, and the lower inner axial surface,
      B. a plunger assembly, the plunger assembly comprising
        1. a projection, and
        2. a top rib, the top rib having a top rib upper surface, a top rib lower surface, and a top rib guide surface,
        3. the top rib guide surface being slidably disposed along the upper inner axial surface,
        4. the top rib lower surface being spring-biased against the bearing ledge, and
        5. the projection being engaged with the chain,
      C. a spring, the spring comprising
        1. an upper spring end, and
        2. a lower spring end opposite the upper spring end,
        3. the lower spring end exerting an axial force against the top rib upper surface of the plunger assembly, and
      D. a detent cap, the detent cap being in threaded engagement with the upper inner axial surface, and variably restraining the upper spring end; and
    (iii) at least one adjustable fastener mounted on the alignment bar assembly, the adjustable fastener comprising
      A. a fastener head, and
      B. a radially-inward fastener contact area,
      C. the fastener contact area exerting an alignment force on the connecting workpiece, and
      D. the fastener contact area having a depression.

18. The clamp assembly of claim 17, wherein the detent cap has a cap indentation at its center.

19. The clamp assembly of claim 17, wherein the fastener head has a head indentation at its center.

20. The clamp assembly of claim 17, wherein the detent cap has a cap hole of sufficient size to permit lubrication, while excluding debris.

21. The clamp assembly of claim 17, wherein the detent cap has a cap hole of not more than approximately 1 mm (0.04 in.) in diameter.

22. The clamp assembly of claim 17, wherein the plunger assembly is hardened.

23. The clamp assembly of claim 17, wherein the plunger assembly has a spring seat.

24. The clamp assembly of claim 17, wherein the link chain is colored according to a range of cross-sectional perimeters of the first workpiece.

25. A alignment clamp assembly, for aligning a first workpiece, and at least one connecting-workpiece, the alignment clamp assembly comprising:
(a) a chain, the chain comprising
   (i) an upper link portion,
   (ii) a lower link portion,
   (iii) a plurality of pivot pins projecting from opposite sides of the chain,
   (iv) an attached end area,
   (v) a free end area,
   (vi) a wedge-shaped end piece, the end piece removably attached to the free end area of the chain,
   (vii) a connection area, the connection area located between the attached end area and the free end area, and
   (viii) an encompassing section, formed by the chain between the attached end area and the connection area, the encompassing section encompassing the first workpiece;
(b) a locking wrench, the locking wrench attached to the attached end area of the chain, and removably connected to the connection area of the chain;
(c) an alignment apparatus, the alignment apparatus comprising
   (i) an alignment bar assembly, the alignment bar assembly comprising
      A. an upper bar, the upper bar comprising
         1. an upper bar upper surface, and
         2. an upper bar lower surface, the upper bar lower surface having an upper slot, and
         3. the upper bar having an upper bar hole between the upper bar upper surface and the upper slot, and
      B. a lower bar, the lower bar comprising
         1. a lower bar upper surface, the lower bar upper surface having a lower slot and a lower groove, and
         2. a lower bar lower surface,
      C. the alignment bar assembly being oriented transverse to the link chain,
      D. the upper bar being mounted on the lower bar, such that
         1. the upper slot slidably accommodates the upper link portion of the chain,
         2. the lower slot slidably accommodates the lower link portion of the chain, and
         3. the lower groove slidably accommodates the pivot pins of the chain;
   (ii) a spring-loaded detent assembly mounted on the upper bar of the alignment bar assembly, the detent assembly comprising
      A. a detent casing, the detent casing having an inner detent surface,
      B. a plunger assembly, the plunger assembly comprising
         1. a projection, and
         2. a top rib, the top rib having a top rib upper surface, a top rib lower surface, and a top rib guide surface,
         3. the top rib guide surface being slidably disposed along the inner. detent surface,
         4. the top rib lower surface being spring-biased against the upper bar upper surface, and
         5. the projection being slidably disposed through the upper bar hole, and engaged with the chain,
      C. a spring, the spring comprising
         1. an upper spring end and
         2. a lower spring end opposite the upper spring end,
         3. the lower spring end exerting an axial force against the top rib upper surface of the plunger assembly, and
      D. a detent cap, the detent cap being in threaded engagement with the detent casing, and variably restraining the upper spring end; and
   (iii) at least one adjustable fastener mounted on the alignment bar assembly, the adjustable fastener comprising
      A. a fastener head, and
      B. a radially-inward fastener contact area,
      C. the fastener contact area exerting an alignment force on the connecting workpiece, and
      D. the fastener contact area having a depression.

26. The clamp assembly of claim 25, wherein the detent cap has a cap indentation at its center.

27. The clamp assembly of claim 25, wherein the fastener head has a head indentation at its center.

28. The clamp assembly of claim 25, wherein the detent cap has a cap hole of sufficient size to permit lubrication, while excluding debris.

29. The clamp assembly of claim 25, wherein the detent cap has a cap hole of not more than approximately 1 mm (0.04 in.) in diameter.

30. The clamp assembly of claim 25, wherein the plunger assembly is hardened.

31. The clamp assembly of claim 25, wherein the plunger assembly has a spring seat.

32. The clamp assembly of claim 25, wherein the link chain is colored according to a range of cross-sectional perimeters of the first workpiece.

33. An alignment apparatus, adapted for slidable engagement with a flexible member, the flexible member encompassing a first workpiece, the alignment apparatus bridging the first workpiece, and at least one connecting workpiece, the alignment apparatus comprising:
(a) an alignment bar assembly, the alignment bar assembly comprising
   (i) an upper bar, the upper bar comprising
      A. an upper bar upper surface, and
      B. an upper bar lower surface,
      C. the upper bar lower surface having an upper slot, and
      D. the upper bar having an upper bar hole;
   (ii) a lower bar, the lower bar comprising
      A. a lower bar upper surface, and
      B. a lower bar lower surface,
      C. the lower bar upper surface having a T-shaped groove;
   (iii) the upper bar mounted on the lower bar, such that the T-shaped groove is aligned with the upper slot, to slidably accommodate the flexible member;
(b) a detent assembly, the detent assembly comprising
   (i) a spring-biased plunger assembly having a projection, the projection engaging the flexible member through the upper bar hole, and
   (ii) a detent cap,
   (iii) the degree of spring bias being variably adjustable by the detent cap; and (c) one or more adjustable fasteners mounted on the alignment bar assembly, the adjustable fastener comprising
  (i) a fastener head, and
  (ii) a radially-inward fastener contact area,
  (iii) the fastener contact area exerting an alignment force on the connecting workpiece.

34. The alignment apparatus of claim 33, wherein the detent cap has a cap indentation at its center.

35. The alignment apparatus of claim 33, wherein the fastener head has a head indentation at its center.

36. The alignment apparatus of claim 33, wherein the detent cap has a cap hole of not more than approximately 1 mm (0.04 in.) in diameter.

37. The alignment apparatus of claim 33, wherein the plunger assembly is hardened.

38. The alignment apparatus of claim 33, wherein the fastener contact area has a depression.

39. The alignment apparatus of claim 33, wherein the plunger assembly has a spring seat.

40. An alignment apparatus, adapted for slidable engagement with a chain, the chain encompassing a first workpiece, the alignment apparatus disposed on the first workpiece, and overlying at least one connecting workpiece, the alignment apparatus comprising:
  (a) an alignment bar assembly, the alignment bar assembly comprising
    (i) an upper bar, the upper bar comprising
      A. an upper bar upper surface,
      B. an upper bar lower surface,
      C. the upper bar lower surface having an upper slot,
      D. the upper bar having an upper bar hole;
    (ii) a lower bar, the lower bar comprising
      A. a lower bar upper surface, and
      B. a lower bar lower surface,
      C. the lower bar upper surface having a lower slot and a lower groove;
    (iii) the upper bar being mounted on the lower bar, such that the upper slot, lower slot, and lower groove slidably accommodate the chain;
  (b) a spring-loaded detent assembly disposed in the upper bar hole, the detent assembly comprising
    (i) a detent casing, the detent casing comprising
      A. an upper inner axial surface,
      B. a lower inner axial surface, and
      C. a bearing ledge,
      D. the bearing ledge connecting the upper inner axial surface, and the lower inner axial surface,
    (ii) a plunger assembly, the plunger assembly comprising
      A. a projection, and
      B. a top rib, the top rib having a top rib upper surface, a top rib lower surface, and a top rib guide surface,
      C. the top rib guide surface being slidably disposed along the upper inner axial surface,
      D. the top rib lower surface being spring-biased against the bearing ledge, and
      E. the projection being engaged with the chain,
    (iii) a spring, the spring comprising
      A. an upper spring end and
      B. a lower spring end opposite the upper spring end,
      C. the lower spring end exerting an axial force against the top rib upper surface of the plunger assembly, and
    (iv) a detent cap, the detent cap being in threaded engagement with the upper inner axial surface, and variably restraining the upper spring end; and
  (c) at least one adjustable fastener mounted on the alignment apparatus, the adjustable fastener comprising
    (i) a fastener head, and
    (ii) a radially-inward fastener contact area,
    (iii) the fastener contact area exerting an alignment force on the connecting workpiece, and
    (iv) the fastener contact area having a depression.

41. The alignment apparatus of claim 40, wherein the detent cap has a cap indentation at its center.

42. The alignment apparatus of claim 40, wherein the fastener head is circular in shape, said circular fastener head having a head indentation at its center.

43. The alignment apparatus of claim 40, wherein
  (a) the fastener head is annular in shape,
  (b) the adjustable fastener having a fastener shank, the fastener shank having a shank head disposed within the annular fastener head,
  (c) the shank head having a head indentation.

44. The alignment apparatus of claim 40, wherein the detent cap has a cap hole of not more than approximately 1 mm (0.04 in.) in diameter.

45. The alignment apparatus of claim 40, wherein the plunger assembly is hardened.

46. The alignment apparatus of claim 40, wherein the plunger assembly has a spring seat, the spring seat restraining lateral movement of the lower spring end.

47. An alignment apparatus, adapted for slidable engagement with a chain, the chain encompassing a first workpiece, the alignment apparatus disposed on the first workpiece, and overlying at least one connecting workpiece, the alignment apparatus comprising:
  (a) an alignment bar assembly, the alignment bar assembly comprising
    (i) an upper bar, the upper bar comprising
      A. an upper bar upper surface,
      B. an upper bar lower surface,
      C. the upper bar lower surface having an upper slot,
      D. the upper bar having an upper bar hole;
    (ii) a lower bar, the lower bar comprising
      A. a lower bar upper surface, and
      B. a lower bar lower surface,
      C. the lower bar upper surface having a lower slot and a lower groove;
    (iii) the upper bar being mounted on the lower bar, such that the upper slot, lower slot, and lower groove slidably accommodate the chain;
  (b) a spring-loaded detent assembly mounted on the upper bar, the detent assembly comprising
    (i) a detent casing, the detent casing having an inner detent surface,
    (ii) a plunger assembly, the plunger assembly comprising
      A. a projection, and
      B. a top rib, the top rib having a top rib upper surface, a top rib lower surface, and a top rib guide surface,
      C. the top rib guide surface being slidably disposed along the inner detent surface,
      D. the top rib lower surface being spring-biased against the upper bar upper surface, and
      E. the projection being engaged with the chain,
    (iii) a spring, the spring comprising
      A. an upper spring end and
      B. a lower spring end opposite the upper spring end,
      C. the lower spring end exerting an axial force against the top rib upper surface of the plunger assembly, and (iv) a detent cap, the detent cap being in threaded engagement with the upper inner axial surface, and variably restraining the upper spring end; and (c) at least one adjustable fastener mounted on the alignment apparatus, the adjustable fastener comprising
  (i) a fastener head, and
  (ii) a radially-inward fastener contact area,
  (iii) the fastener contact area exerting an alignment force on the connecting workpiece, and
  (iv) the contact area having a depression.

48. The alignment apparatus of claim 47, wherein the detent cap has a cap indentation at its center.

49. The alignment apparatus of claim 47, wherein the fastener head is circular in shape, said circular fastener head having a head indentation at its center.

50. The alignment apparatus of claim 47, wherein the detent cap has a cap hole of not more than approximately 1 mm (0.04 in.) in diameter.

51. The alignment apparatus of claim 47, wherein
  (a) the fastener head is annular in shape,
  (b) the adjustable fastener having a fastener shank, the fastener shank having a shank head disposed within the annular fastener head,
  (c) the shank head having a head indentation.

52. The alignment apparatus of claim 47, wherein the plunger assembly is hardened.

53. The alignment apparatus of claim 47, wherein the plunger assembly has a spring seat, the spring seat restraining lateral movement of the lower spring end.

* * * * *

UNITED STATES PATENT AND TRADEMARK OFFICE
CERTIFICATE OF CORRECTION

PATENT NO. : 6,651,967 B1  Page 1 of 1
DATED : November 25, 2003
INVENTOR(S) : Franklin Barber It is certified that error appears in the above-identified patent and that said Letters Patent is hereby corrected as shown below:

<u>Title page,</u>
Item [*] Notice, should read:
-- [*] Notice: Subject to any disclaimer, the term of this patent is extended or adjusted under 35 U.S.C 154(b) by 138 days. --

Signed and Sealed this

Seventeenth Day of February, 2004

JON W. DUDAS
*Acting Director of the United States Patent and Trademark Office*